(12) United States Patent
Baba et al.

(10) Patent No.: US 12,222,523 B2
(45) Date of Patent: Feb. 11, 2025

(54) PRISM LENS, LIGHT DEFLECTION DEVICE, AND LIDAR APPARATUS

(71) Applicant: National University Corporation YOKOHAMA National University, Yokohama (JP)

(72) Inventors: Toshihiko Baba, Yokohama (JP); Hiroshi Abe, Yokohama (JP); Daichi Akiyama, Yokohama (JP)

(73) Assignee: NATIONAL UNIVERSITY CORPORATION YOKOHAMA NATIONAL UNIVERSITY, Yokohama (JP)

( * ) Notice: Subject to any disclaimer, the term of this patent is extended or adjusted under 35 U.S.C. 154(b) by 884 days.

(21) Appl. No.: 17/290,220

(22) PCT Filed: Oct. 17, 2019

(86) PCT No.: PCT/JP2019/040829
§ 371 (c)(1),
(2) Date: Feb. 15, 2022

(87) PCT Pub. No.: WO2020/090487
PCT Pub. Date: May 7, 2020

(65) Prior Publication Data
US 2022/0171101 A1    Jun. 2, 2022

(30) Foreign Application Priority Data
Oct. 30, 2018    (JP) ................................. 2018-203714

(51) Int. Cl.
*G02B 6/124*    (2006.01)
*G01S 7/481*    (2006.01)
(Continued)

(52) U.S. Cl.
CPC .......... *G02B 3/0056* (2013.01); *G01S 7/4817* (2013.01); *G02B 3/06* (2013.01); *G02B 6/124* (2013.01); *G02B 5/04* (2013.01)

(58) Field of Classification Search
None
See application file for complete search history.

(56) References Cited

U.S. PATENT DOCUMENTS 5,105,403 A * 4/1992 Kando .................... G11B 7/124
                                               369/112.14
5,496,993 A * 3/1996 Kasuga ................ G11B 7/1365
(Continued)

FOREIGN PATENT DOCUMENTS

CN    1488084 A    4/2004
CN    202339419 U    7/2012
(Continued)

OTHER PUBLICATIONS

China National Intellectual Property Administration, Office Action and Search Report Issued in Application No. 201980071731.6, Feb. 22, 2022, 17 pages.
(Continued)

*Primary Examiner* — Kaveh C Kianni
(74) *Attorney, Agent, or Firm* — McCoy Russell LLP

(57) ABSTRACT

A prism lens includes a prism lens body and at least one cylindrical lens. The prism lens body has a set of facing planes a mutual distance of which decreases or increases from one end to another end. The cylindrical lens is integral to at least one plane of the set of planes. The cylindrical lens is formed such that a cross section shape thereof at a plane perpendicular to a direction of a slope of a plane of the prism lens body having the cylindrical lens thereon with respect to
(Continued)

the other plane of the set of planes has a certain curved shape to be convex against the plane having the cylindrical lens thereon.

3 Claims, 27 Drawing Sheets

(51) Int. Cl.
    *G02B 3/00*         (2006.01)
    *G02B 3/06*         (2006.01)
    *G02B 5/04*         (2006.01)

(56) References Cited

U.S. PATENT DOCUMENTS

| | | | | |
|---|---|---|---|---|
| 5,706,140 | A * | 1/1998 | Nishino | G01S 7/4811 359/809 |
| 6,454,467 | B1 * | 9/2002 | Ishihara | G02B 6/4246 398/79 |
| 6,970,615 | B1 * | 11/2005 | Fang | G02B 6/3524 385/16 |
| 8,384,847 | B2 * | 2/2013 | Han | G02F 1/133606 349/61 |
| 8,599,489 | B2 * | 12/2013 | Shalaev | B82Y 20/00 359/665 |
| 8,634,139 | B1 * | 1/2014 | Brown | G02F 1/163 359/630 |
| 8,876,409 | B2 * | 11/2014 | Ohara | G02B 6/262 385/84 |
| 9,519,116 | B2 * | 12/2016 | Hung | G02B 6/4228 |
| 9,715,067 | B1 * | 7/2017 | Brown | G02B 27/0081 |
| 2004/0071179 | A1 | 4/2004 | Zanger et al. | |
| 2007/0029563 | A1 * | 2/2007 | Amano | G02B 3/02 257/E33.059 |
| 2007/0251915 | A1 | 11/2007 | Oohara et al. | |
| 2008/0129964 | A1 * | 6/2008 | Alasaarela | G03B 21/147 362/311.06 |
| 2008/0225257 | A1 | 9/2008 | Kita | |
| 2008/0226228 | A1 * | 9/2008 | Tamura | G02B 6/4214 385/33 |
| 2010/0266241 | A1 * | 10/2010 | Hosoda | G02B 6/4201 216/26 |
| 2011/0051252 | A1 | 3/2011 | Poulsen | |
| 2011/0304916 | A1 * | 12/2011 | Ushigome | G02B 27/4272 359/576 |
| 2012/0263416 | A1 * | 10/2012 | Morioka | G02B 6/4214 385/33 |
| 2013/0163924 | A1 * | 6/2013 | Lin | G02B 6/4214 385/33 |
| 2013/0259419 | A1 * | 10/2013 | Charbonneau-Lefort | G02B 6/32 385/14 |
| 2013/0259423 | A1 * | 10/2013 | Charbonneau-Lefort | G02B 6/4224 359/356 |
| 2014/0064689 | A1 * | 3/2014 | Kuo | G02B 6/4214 385/134 |
| 2014/0153872 | A1 * | 6/2014 | Lin | G02B 6/42 385/33 |
| 2014/0199030 | A1 * | 7/2014 | Lin | G02B 6/4214 385/89 |
| 2014/0334785 | A1 * | 11/2014 | Harumoto | G02B 6/4204 385/93 |
| 2015/0036985 | A1 * | 2/2015 | Shibuya | G02B 6/425 385/93 |
| 2015/0370020 | A1 * | 12/2015 | Engel | G02B 6/4214 385/33 |
| 2018/0372923 | A1 | 12/2018 | Wijaya et al. | |
| 2019/0033522 | A1 * | 1/2019 | Baba | G02B 6/125 |

FOREIGN PATENT DOCUMENTS

| | | | |
|---|---|---|---|
| CN | 105934902 A * | 9/2016 | G02B 17/08 |
| JP | S59228221 A | 12/1984 | |
| JP | H01221719 A | 9/1989 | |
| JP | H0772311 A | 3/1995 | |
| JP | 2007048775 A | 2/2007 | |
| JP | 2009206018 A | 9/2009 | |
| JP | 2010039037 A | 2/2010 | |
| WO | 2017126386 A1 | 7/2017 | |

OTHER PUBLICATIONS

China National Intellectual Property Administration, Office Action and Search Report Issued in Application No. 201980071731.6, Sep. 16, 2022, 16 pages.
ISA Japan Patent Office, International Search Report Issued in Application No. PCT/JP2019/040829, Jan. 7, 2020, WIPO, 4 pages.
European Patent Office, Extended European Search Report Issued in Application No. 19880777.8, Jun. 29, 2022, Germany, 9 pages.

* cited by examiner

PRISM LENS, LIGHT DEFLECTION DEVICE, AND LIDAR APPARATUS

CROSS REFERENCE TO RELATED APPLICATIONS

The present application is a U.S. National Phase of International Application No. PCT/JP2019/040829 entitled "PRISM LENS, LIGHT DEFLECTION DEVICE, AND LIDAR APPARATUS," and filed on Oct. 17, 2019. International Application No. PCT/JP2019/040829 claims priority to Japanese Patent Application No. 2018-203714 filed on Oct. 30, 2018. The entire contents of each of the above-listed applications are hereby incorporated by reference for all purposes.

TECHNICAL FIELD

The present invention relates to a prism lens, a light deflection device, and a LiDAR apparatus.

BACKGROUND AND SUMMARY

A laser radar or Light Detection and Ranging, Laser Imaging Detection and Ranging (LiDAR) apparatus using laser measurement that performs three-dimensional imaging on surroundings and acquires a distance to a surrounding object as a two-dimensional image have been developed. This technical field is used for automatic driving of automobiles, creation of three-dimensional maps, etc., and the basic technologies thereof are also applicable to laser printers, laser displays, laser processing machines, etc.

In this technical field, a light beam is applied to an object, the reflected light reflected and returned from the object is detected, information on the distance is obtained from the time difference and frequency difference thereof, and the light beam is scanned two-dimensionally so as to obtain wide-angle three-dimensional information.

A light deflection device is used in the light beam scanning. Traditionally used are mechanical mechanisms such as rotation of the entire device, mechanical mirrors such as polygonal mirrors (polygon mirrors) and galvanometer mirrors, and small integrated mirrors using micro machine technology (Micro Electro Mechanical Systems (MEMS) technology). However, since these mechanical mechanisms have problems associated with their large sizes, increased costs, and instability on a moving object that oscillates, researches have been widely conducted on non-mechanical light deflection devices in recent years.

As a non-mechanical light deflection device, devices of a phased array type and a diffraction grating type that realizes light deflection by changing the wavelength of light or the refractive index of the device have been proposed. Here, a phased array type light deflection device has a problem that it is very difficult to adjust the phase of a large number of light radiators arranged in an array and it is difficult to form high-quality sharp light beams. Meanwhile, a diffraction grating type light deflection device can readily form sharp beams but has a problem that the optical deflection angle is small.

To address the problem of a small light deflection angle, the inventor of the present invention has proposed a technique of increasing the light deflection angle by coupling a slow light waveguide to a diffraction mechanism such as a diffraction grating (Patent Literature 1). Slow light, which is generated in a photonic nanostructure such as a photonic crystal waveguide, is characterized by the fact that it has a low group velocity and causes significant change in the propagation coefficient due to slight change in the wavelength and the refractive index of the waveguide. When a diffraction mechanism is installed inside or immediately near the slow light waveguide, the slow light waveguide is coupled to the diffraction mechanism and becomes a leaky waveguide, which radiates light to free space. At this point, significant change in the propagation constant affects the deflection angle of the radiated light, as a result of which a large deflection angle is realized. A cylindrical lens is used to suppress the spread in the right-left direction with respect to the direction along the waveguide of the light radiated from the photonic crystal waveguide.

CITATION LIST

Patent Literature

International Patent Publication No. WO 2017/126386

Technical Problem

The light deflection device according to Patent Literature 1 above cannot radiate light in the directly upward direction (at a radiation angle $\theta=0°$). The photonic crystal waveguide with a diffraction mechanism causes the propagated light in a diagonally upper direction to be radiated due to Bragg diffraction. Here, waves of $\theta=0°$ that is perpendicular to the waveguide satisfy the diffraction condition when propagated light forms standing waves that reciprocate in the front and back directions. Since, in such standing waves, a positive phase and a negative phase of an electric field of the propagated light exist in the same manner, the far field of the radiated light beam is cancelled in principle. In fact, when the radiation angle $\theta$ is close to $0°$, the intensity of the radiated beam is rapidly weakened. Therefore, the light radiated at such an angle cannot be used. The cylindrical lens according to Patent Literature 1 only suppresses the spread in the right-left direction with respect to the direction along the waveguide of the light radiated from the photonic crystal waveguide, and it is difficult to deflect light in an oblique direction radiated from the waveguide to the directly upward direction.

The cylindrical lens according to Patent Literature 1 also has a problem that, when the radiation angle of light changes, the focal length changes because the radius of curvature of the cylindrical lens viewed from the radiated light changes, and the collimating condition is thus displaced.

The present invention has been made in view of the problems, and it is an object of the present invention to provide a prism lens, a light deflection device and a LiDAR apparatus that can deflect light in an oblique direction radiated from a waveguide to a direction in vicinity of the directly upward direction.

It is another object of the present invention to provide a prism lens, a light deflection device and a LiDAR apparatus by which a collimating condition is not easily displaced even when the radiation angle of light changes.

Solution to Problem

A prism lens according to the present invention includes a prism lens body having a set of facing planes a mutual distance of which decreases or increases from one end to another end, and at least one cylindrical lens integral to at least one plane of the set of planes. The cylindrical lens is formed such that a cross section shape thereof at a plane perpendicular to a direction of a slope of a plane of the prism lens body having the cylindrical lens thereon with respect to the other plane of the set of planes has a certain curved shape to be convex against the plane having the cylindrical lens thereon.

Preferably, two prism lens bodies having the cylindrical lenses thereon are coupled such that slope directions of the sets of planes of the prism lens bodies are symmetrical.

Preferably, the cylindrical lens is formed on both planes of the set of planes.

Preferably, the prism lens is configured such that light radiated from a waveguide having a diffraction grating formed by periodically arranging a low-refractive-index region on a high-refractive-index member enters from one plane of the set of planes and exits from the other plane of the set of planes.

A light deflection device according to the present invention includes a prism lens and a waveguide having a diffraction grating formed by periodically arranging a low-refractive-index region on a high-refractive-index member.

A LiDAR apparatus according to the present invention includes a light deflection device, a light source configured to cause light to enter the light deflection device, and a photodetector unit configured to detect light received by the light deflection device.

Advantageous Effects of Invention

According to the present invention, a prism lens, a light deflection device and a LiDAR apparatus that can deflect light in an oblique direction radiated from a waveguide to a direction in vicinity of the directly upward direction can be provided.

DETAILED DESCRIPTION

Overview of Embodiments

Overview of embodiments of the present invention is described below with reference to drawings.

Figure 1:
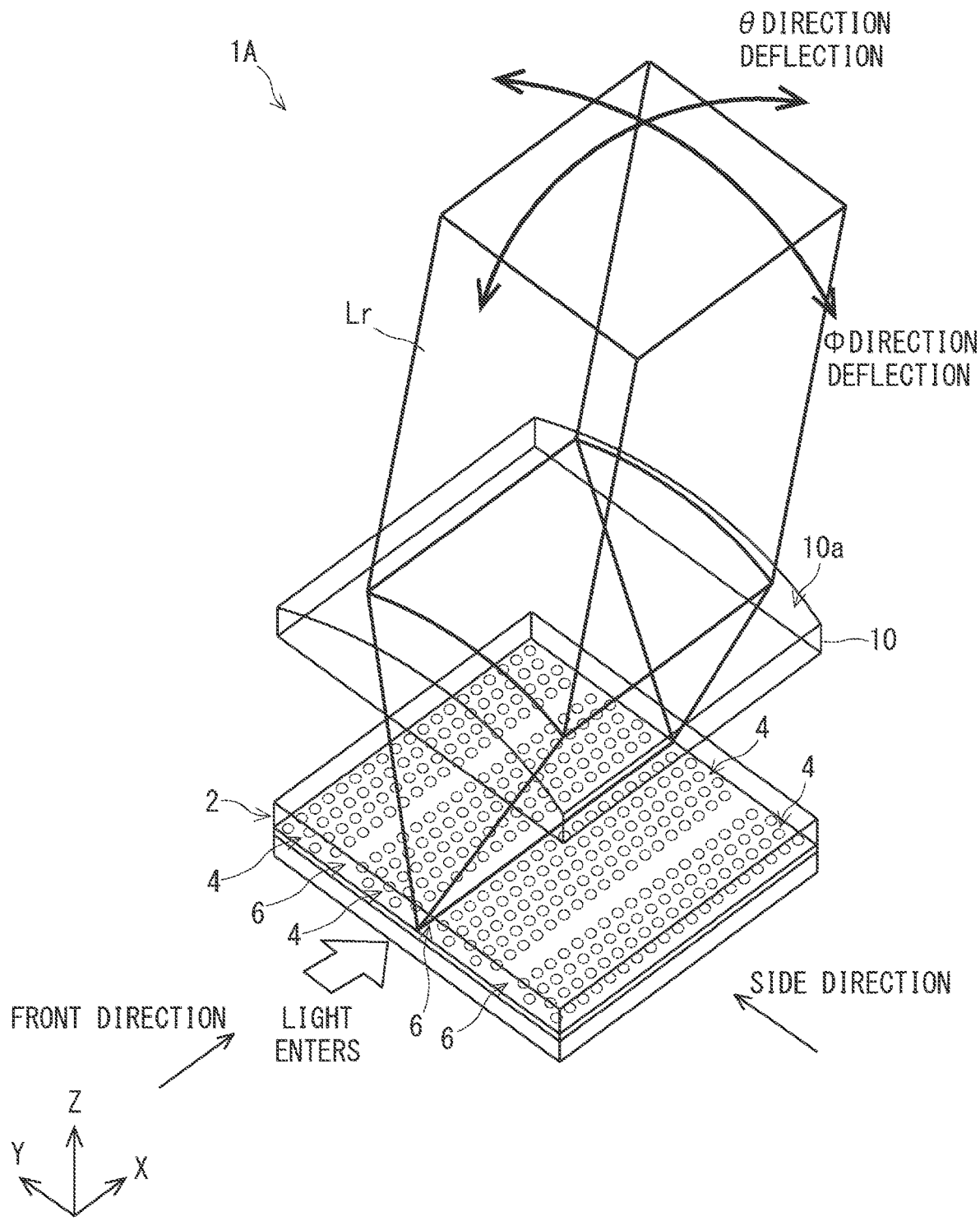
FIG. 1 shows a light deflection device according to a comparison example.
Figure 2:
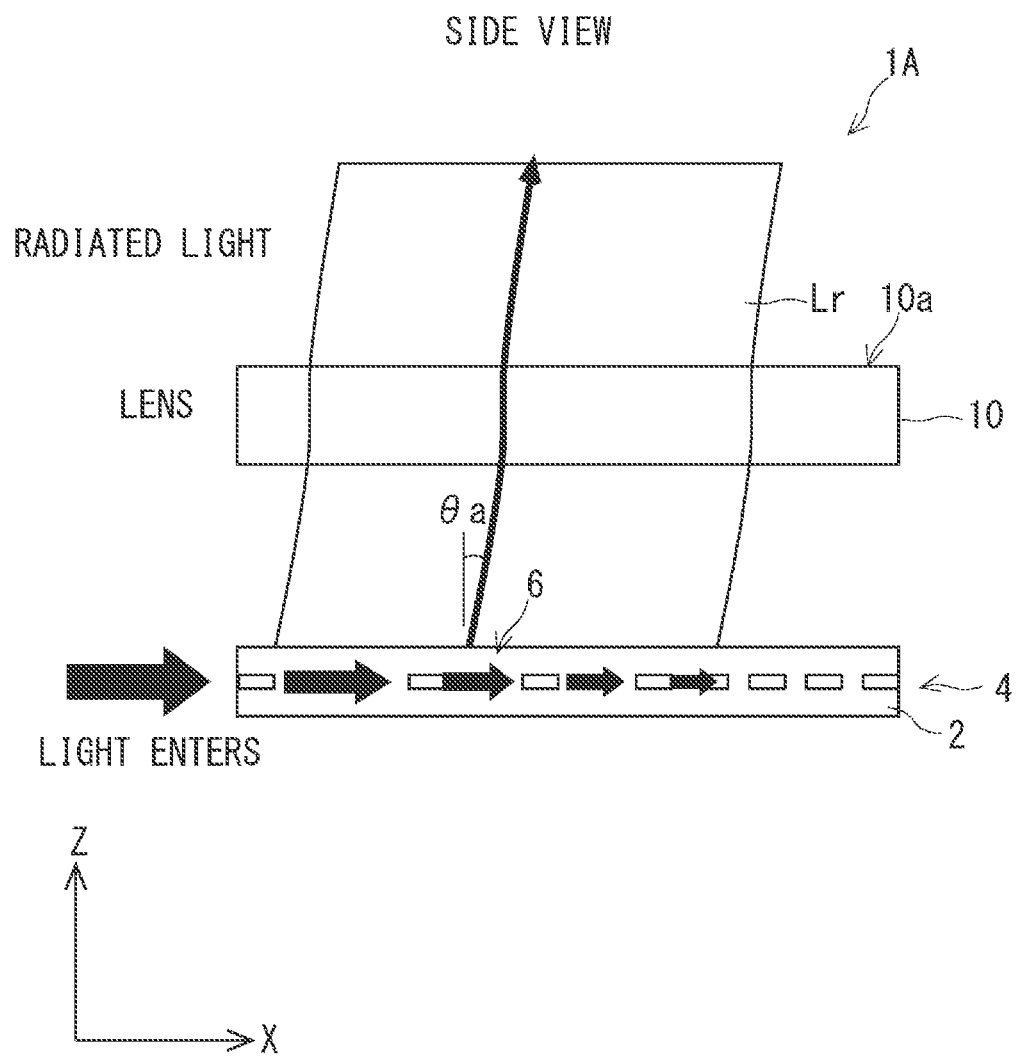
FIG. 2 is a side view of the light deflection device viewed from a side direction according to the comparison example.
Figure 3:
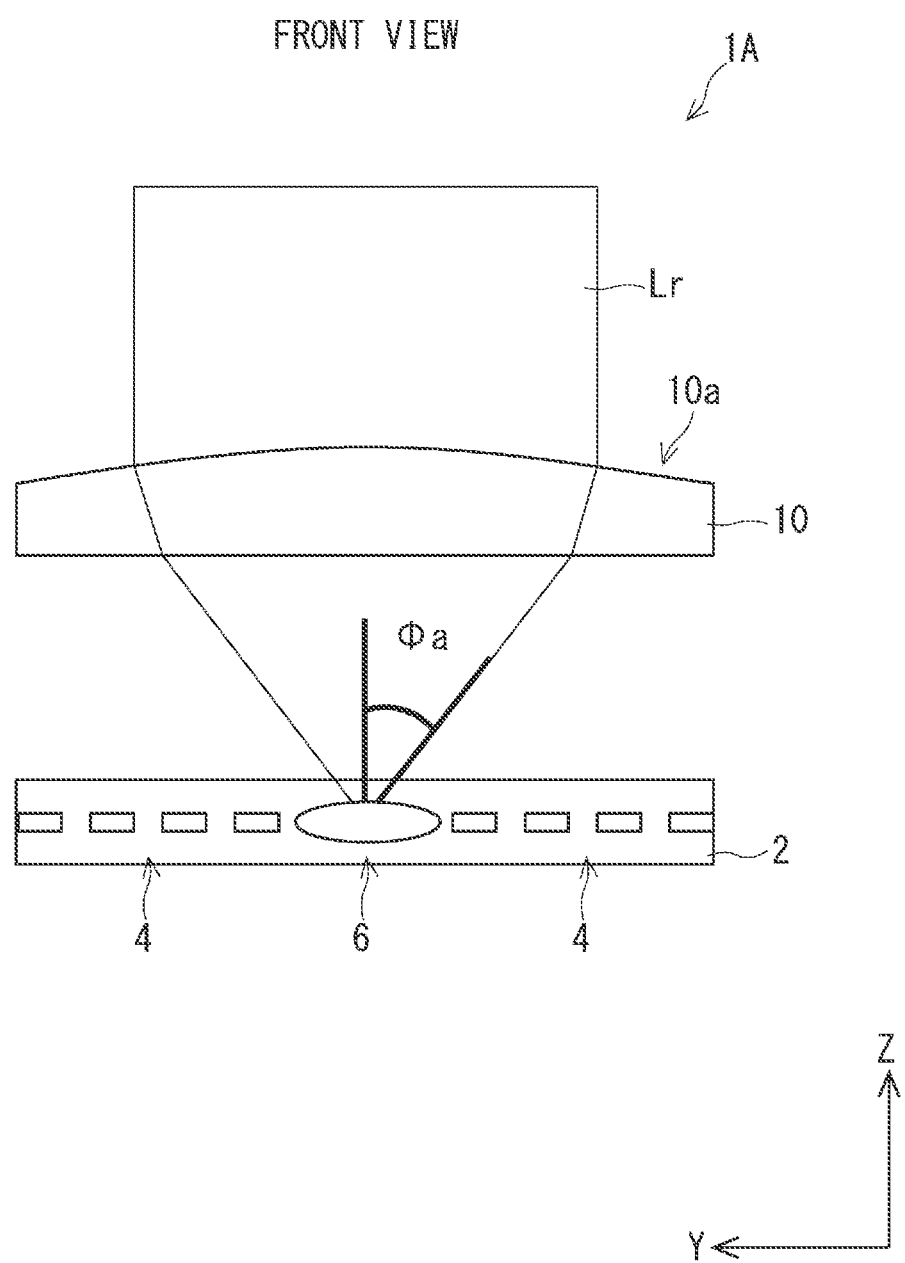
FIG. 3 is a front view of the light deflection device viewed from a front direction according to the comparison example.

FIG. 1 shows a light deflection device 1A according to a comparison example. FIG. 2 is a side view of the light deflection device 1A viewed from a side direction according to the comparison example. FIG. 3 is a front view of the light deflection device 1A viewed from a front direction according to the comparison example.

The light deflection device 1A has a photonic crystal waveguide 2 and a cylindrical lens 10. The cylindrical lens 10 is provided above the photonic crystal waveguide 2 (on a side where light is radiated from the photonic crystal waveguide 2). Since the configuration of the photonic crystal waveguide 2 is substantially the same as the configuration of the photonic crystal waveguide according to Patent Literature 1 above, outline thereof is only described. The photonic crystal waveguide 2 has a diffraction grating 4 and a waveguide 6. The diffraction grating 4 periodically has a low-refractive-index region on a high-refractive-index member made of a semiconductor such as Si. Light enters to the waveguide 6 from a direction of incidence (front direction) so that the waveguide 6 propagates the light.

It is assumed here that the direction of incidence of light on the waveguide 6 is an X axis direction, and a vertically upper direction (directly upper direction) is a Z axis direction. A direction perpendicular to the ZX plane is a Y axis direction (side direction). The swing angle in the right-left direction viewed from the front direction is Φ (Φ direction). In other words, the Φ direction is a direction on the YZ plane. The swing angle in the right-left direction viewed from the side direction is θ (θ direction). In other words, the θ direction is a direction on the ZX plane. The photonic crystal waveguide 2 deflects light to the θ direction by changing the wavelength of the light or the refractive index of the photonic crystal waveguide 2 (diffraction grating 4) and deflects light to the Φ direction by switching the waveguide 6 to change its position relative to the cylindrical lens 10.

The waveguide 6 is formed along the X axis direction (the depth direction viewed from the front direction) at a part where the diffraction grating 4 is not provided. Light that enters to the waveguide 6 is propagated through the waveguide 6 in the X axis direction and is radiated to an upper direction (Z axis direction) of the waveguide 6. In this case, as shown in FIG. 2, the light radiated to the upper direction of the waveguide 6 (radiated light Lr) tilts by an angle θ toward the direction of propagation (X axis direction) with respect to the Z axis direction. Also, as shown in FIG. 3, because the waveguide 6 has a narrow width, the radiated light Lr radiated from the waveguide 6 becomes a beam that spreads at an angle ±Φa in a fan shape in the lateral direction (Y axis direction) viewed from the direction of the light propagation (X axis direction).

The cylindrical lens 10 has a shape that is uniform in the direction along the waveguide 6 (the direction of propagation, that is, the X axis direction) as shown in FIG. 2. In other words, the cylindrical lens 10 has a substantially rectangular shape at the ZX cross section viewed from the side direction. Further in other words, when the cylindrical lens 10 is cut at a plane perpendicular to the Y axis, an upper surface 10a thereof is not curved. On the other hand, the cylindrical lens 10 has the upper surface 10a that curves upward in the direction (Y axis direction) orthogonal to the direction along the waveguide 6 (the direction of propagation, that is, the X axis direction) as shown in FIG. 3. In other words, the cylindrical lens 10 has the upper surface 10a that is upward convex at the ZY cross section viewed from the front direction. Further in other words, when the cylindrical lens 10 is cut at a plane perpendicular to the X axis, the upper surface 10a has an upward convex curve. It should be noted that, as the shape of the cylindrical lens 10, the upper surface 10a is not required to be upward convex but may be downward convex or convex on both sides.

Because of such a shape of the cylindrical lens 10, the spread in the D direction of the radiated light Lr is suppressed. In other words, through the cylindrical lens 10, the radiated light Lr is collimated and is converted to parallel light (collimated beams). Thus, the radiated light Lr that is parallel light is radiated far away in the Z axis direction. It is assumed here that, for the radiation angle θ of the radiated light Lr from the waveguide 6, the position of the cylindrical lens 10 is adjusted such that the radiated light Lr radiated at a radiation angle (θa) in a certain θ direction (see FIG. 2) is collimated. The term "collimate" herein does not limitedly refer to causing emitted light to be strictly parallel. It can be said that light is "collimated" if the spread of the output light is suppressed to an angle in an acceptable range (such as on the order of 0.010 to 0.1°).

Next, problems of the light deflection device 1A shown in FIG. 1 are described.

Figure 4:
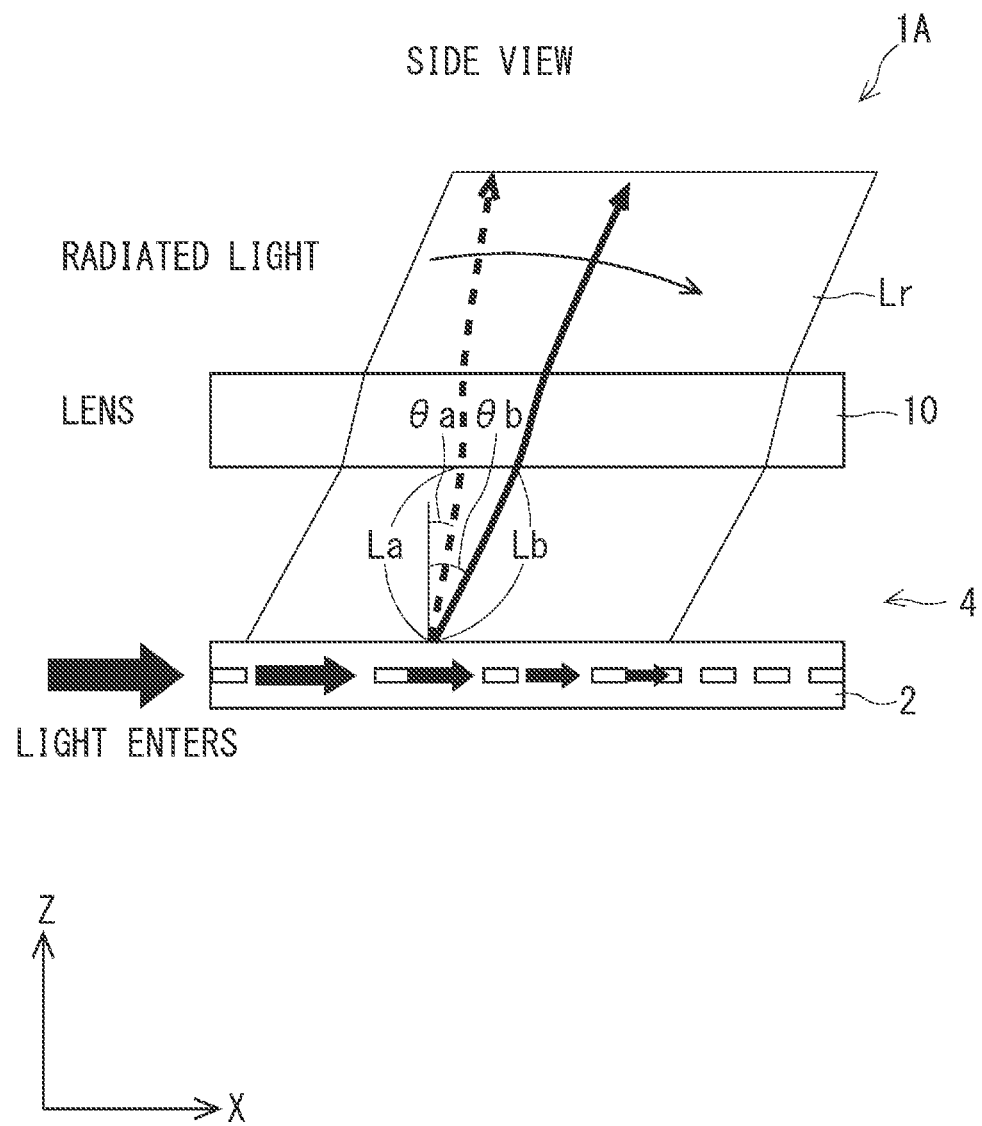
FIG. 4 is a diagram for explaining a first problem of the light deflection device shown in FIG. 1.
Figure 5:
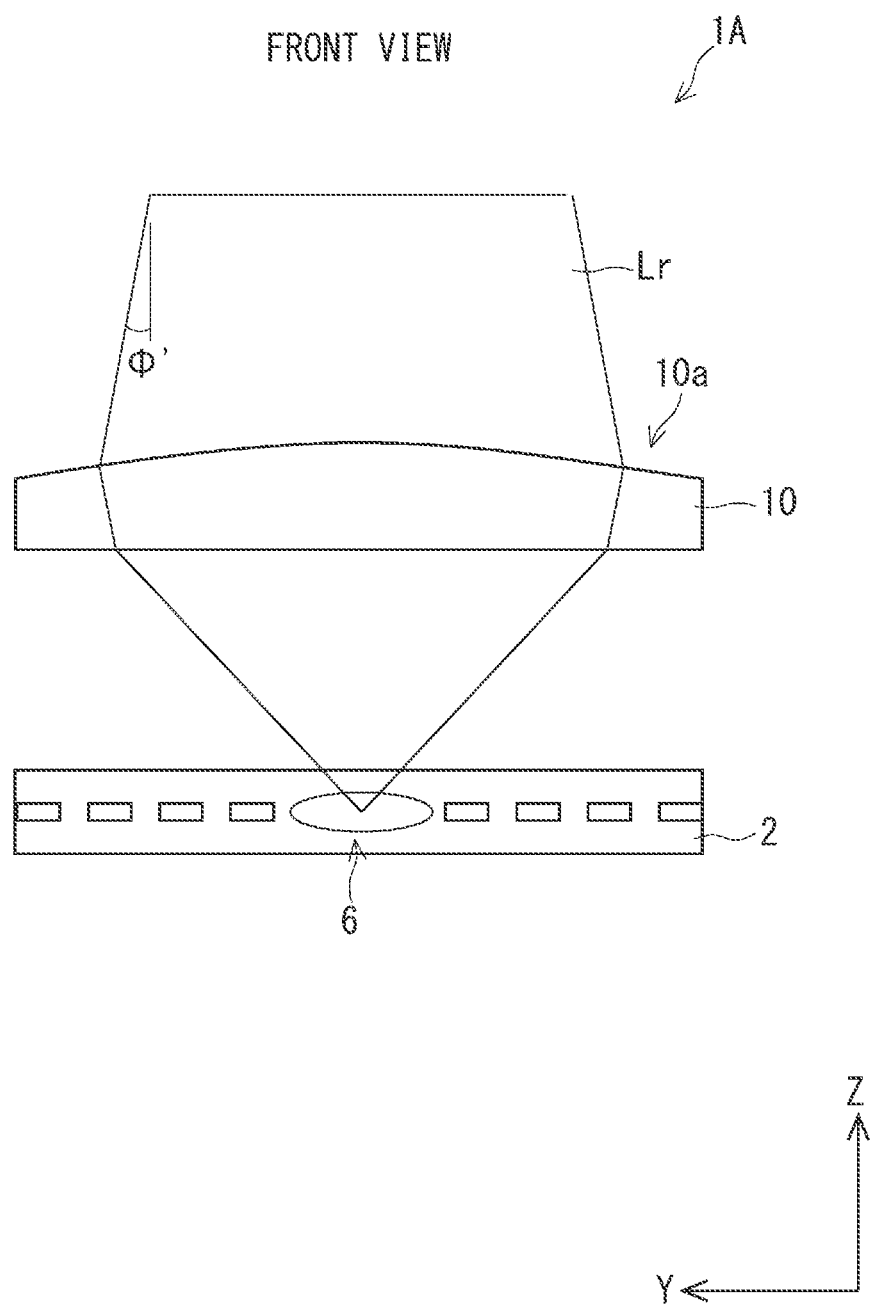
FIG. 5 is a diagram for explaining the first problem of the light deflection device shown in FIG. 1.
Figure 6:
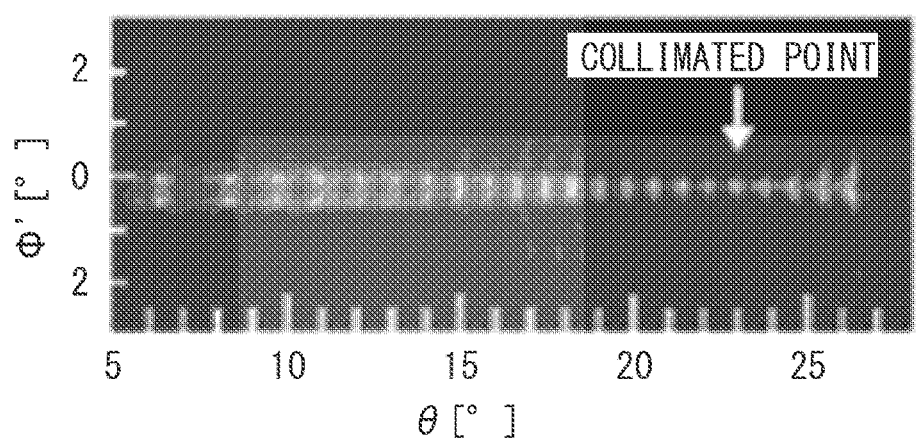
FIG. 6 is a diagram for explaining the first problem of the light deflection device shown in FIG. 1.

FIG. 4 to FIG. 6 are diagrams for explaining a first problem of the light deflection device 1A shown in FIG. 1. As described above, it is assumed that the position of the cylindrical lens 10 is adjusted such that the radiated light Lr radiated at the angle θa is collimated. In this case, it is assumed that the radiation angle θ is changed to θb that is larger than the radiation angle θa in FIG. 2. As a result, the distance (optical path length) from the waveguide 6 to the cylindrical lens 10 is increased from La to Lb.

On the other hand, when the radiation angle θ is increased, since the radiated light Lr crosses the upper surface 10a of the cylindrical lens 10 in an oblique direction, the radius of curvature of the upper surface 10a is small with respect to the direction of travel of the radiated light Lr. This is also apparent from the fact that, regarding a cross section plane of a cylinder cut at a certain plane, the radius of curvature of the cross section plane cut at a plane tilted from a plane perpendicular to the center axis of a cylinder is smaller than the radius of the circle at the bottom though the radius of curvature of the cross section plane cut at a plane perpendicular to the center axis of the cylinder is equal to the radius of the circle at the bottom.

In this way, as the radius of curvature decreases, the focal length decreases, which causes displacement of the focus. In other words, because the condition for enabling to collimate the radiated light Lr is displaced, the radiated light Lr is not collimated even through the cylindrical lens 10 passes through, as shown in FIG. 5. Furthermore, because the distance from the waveguide 6 to the cylindrical lens 10 increases as the radiation angle θa increases as described above though the focal length decreases, the focus is further displaced, which further makes the condition for collimating the radiated light Lr worse. Thus, as shown in FIG. 5, the spread angle Φ' of the radiated light Lr output from the cylindrical lens 10 with respect to the vertical upper direction (Z axis direction) is away from 0°.

FIG. 6 exemplarily illustrates a far-field pattern showing a collimating state in the (direction when the radiation angle θ of light from the waveguide 6 is deflected. In the example shown in FIG. 6, a condition is set such that collimating is performed when θ=23°. In this case, the more θ is away from 23°, the more the spread angle Φ' is away from 0°. In this way, it is difficult for the light deflection device 1A shown in FIG. 1 to collimate the radiated light Lr with respect to the wide radiation angle θ because the focus of the cylindrical lens 10 is displaced when the radiation angle θ is changed.

Figure 7:
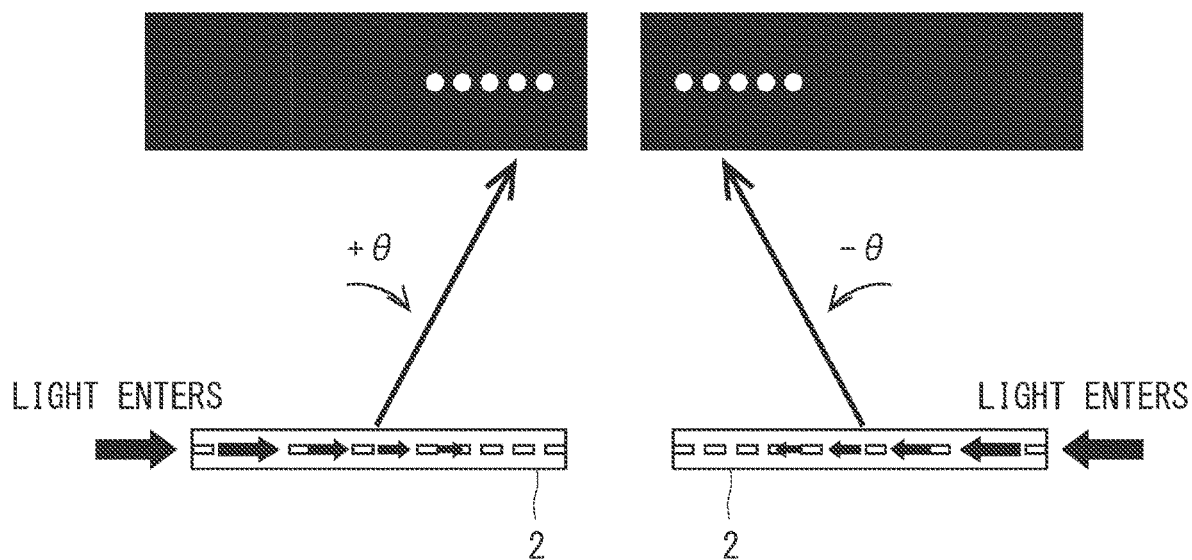
FIG. 7 is a diagram for explaining a second problem of the light deflection device shown in FIG. 1.
Figure 8:
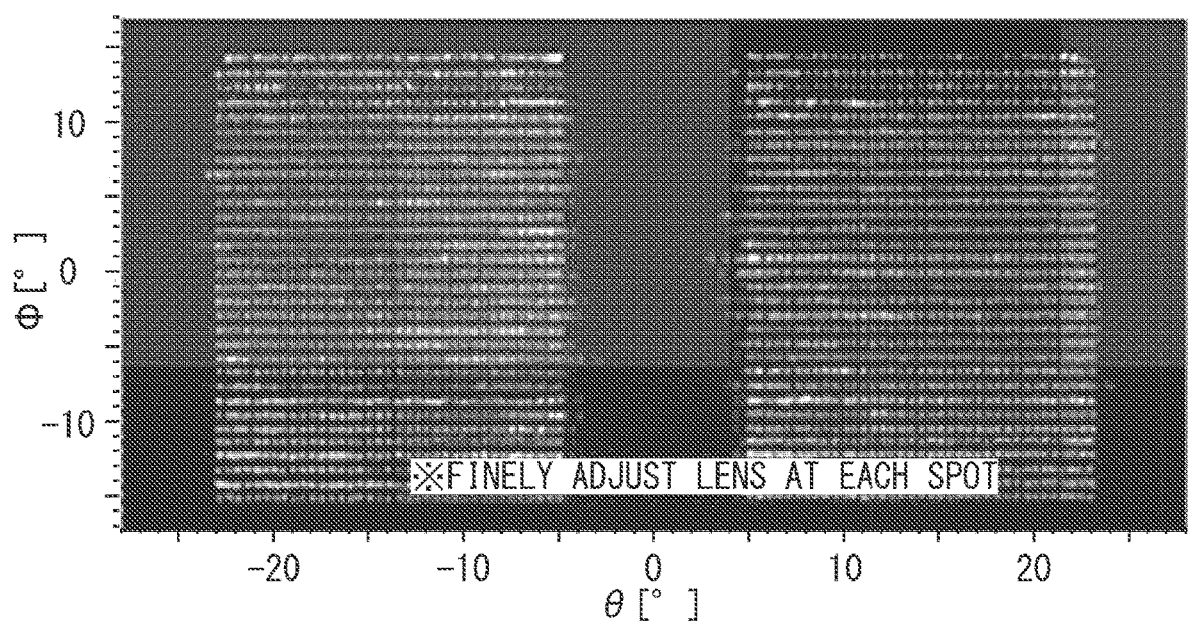
FIG. 8 is a diagram for explaining the second problem of the light deflection device shown in FIG. 1.

FIG. 7 and FIG. 8 are diagrams for explaining a second problem of the light deflection device 1A shown in FIG. 1. As shown in FIG. 7, when the direction of incidence of light to the photonic crystal waveguide 2 is switched, the light is deflected toward the ±θ direction. More specifically, when light enters to the positive direction of the X axis, the light is deflected to the +θ direction. On the other hand, when light enters to the negative direction of the X axis, the light is deflected to the −θ direction. Thus, the deflection range of the light in the θ direction can be enlarged to the double by switching the direction of incidence of light to the right or the left in addition to the deflection of θ by changing the wavelength of the light or the refractive index of the photonic crystal waveguide 2. Here, as described above, through the photonic crystal waveguide 2, light cannot be radiated to the directly upward direction (output angle θ'=0°).

FIG. 8 exemplarily illustrates a far-field pattern of a beam, when light deflection to the θ direction is performed through the right-or-left switching and a thermooptic effect, and light deflection to the (direction is performed by switching the waveguide 6. However, since the focal length of the lens is finely adjusted with respects to spots, the first problem as described above does not barely appear. Here, as being apparent from FIG. 8, the far-field pattern of the beam in vicinity of θ=0° is not observed. Referring to FIG. 8, a beam excluding a range of −10°<θ<10° can be used effectively in fact though the beam in a range of −5°<θ<5° is not observed. Also, the cylindrical lens 10 only suppresses the spread in the right-left direction (Φ direction) with respect to the direction along the waveguide 6 of the light radiated from the photonic crystal waveguide 2, and it is difficult to deflect light in an oblique direction radiated from the waveguide 6 to the directly upward direction (θ'=0°). In this way, it is difficult for the light deflection device 1A shown in FIG. 1 to deflect light in an oblique direction radiated from the waveguide 6 to light in a direction in vicinity of the directly upward direction (output angle θ'=0°).

Meanwhile, the light deflection device according to embodiments can solve the aforementioned first problem and second problem in the manner as described below. More specifically, the problems can be solved by adopting a prism lens having a cylindrical lens integral to at least one of a set of facing planes that are not parallel to each other instead of the cylindrical lens 10. Here, the "set of facing planes that are not parallel to each other" is a set of facing planes a mutual distance of which increases or decreases from one end to another end.

Figure 9:
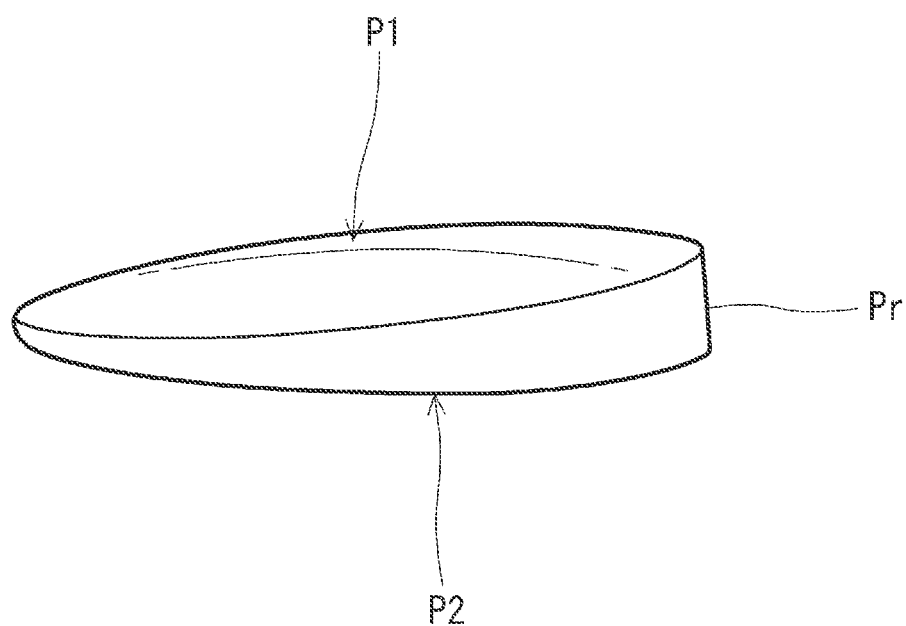
FIG. 9 shows an example of a general prism lens.

FIG. 9 shows an example of a general prism lens Pr. The prism lens has a sloping thickness. Therefore, the prism lens has a set of facing planes P1 and P2 that are not parallel to each other. In other words, the plane P1 and the plane P2 are the set of facing planes a mutual distance of which increases or decreases from one end to another end. For example, in FIG. 9, the distance between the plane P1 and the plane P2 increases from the left end to the right end. Conversely, in FIG. 9, the distance between the plane P1 and the plane P2 decreases from the right end to the left end. When light passes through the prism lens Pr, the direction of travel of the light bends. This property of the prism lens is used in embodiments.

First Embodiment

Figure 10:
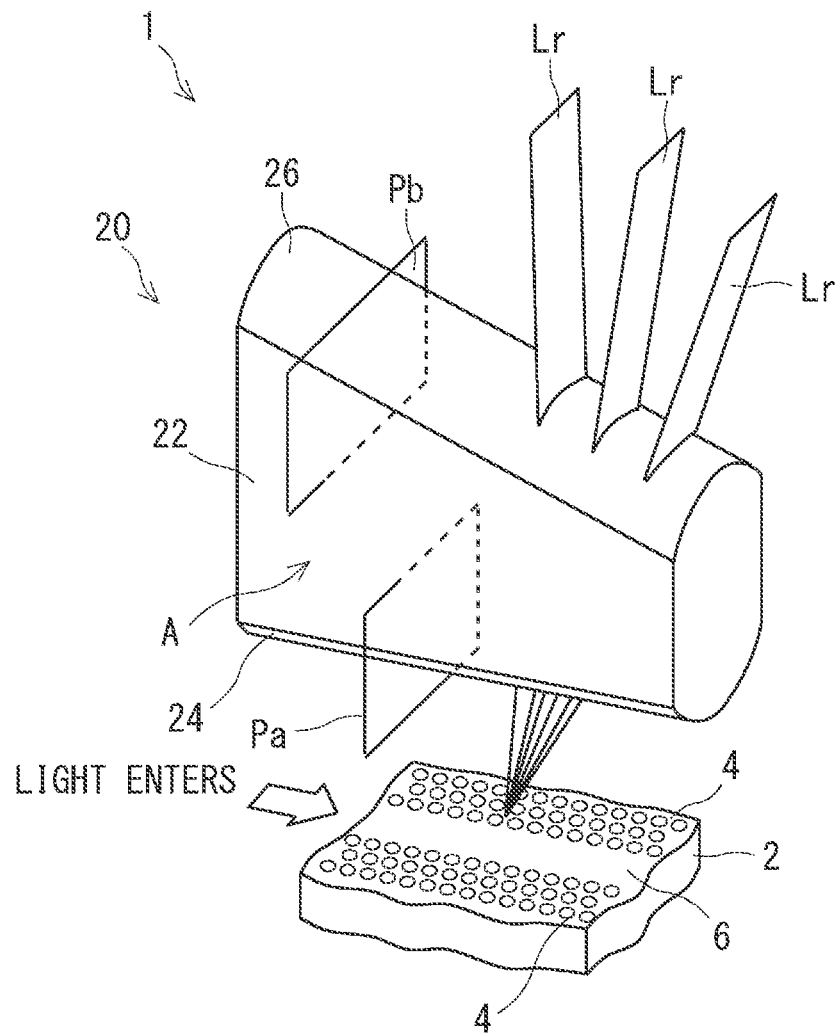
FIG. 10 is a perspective view showing a light deflection device according to a first embodiment.
Figure 11:
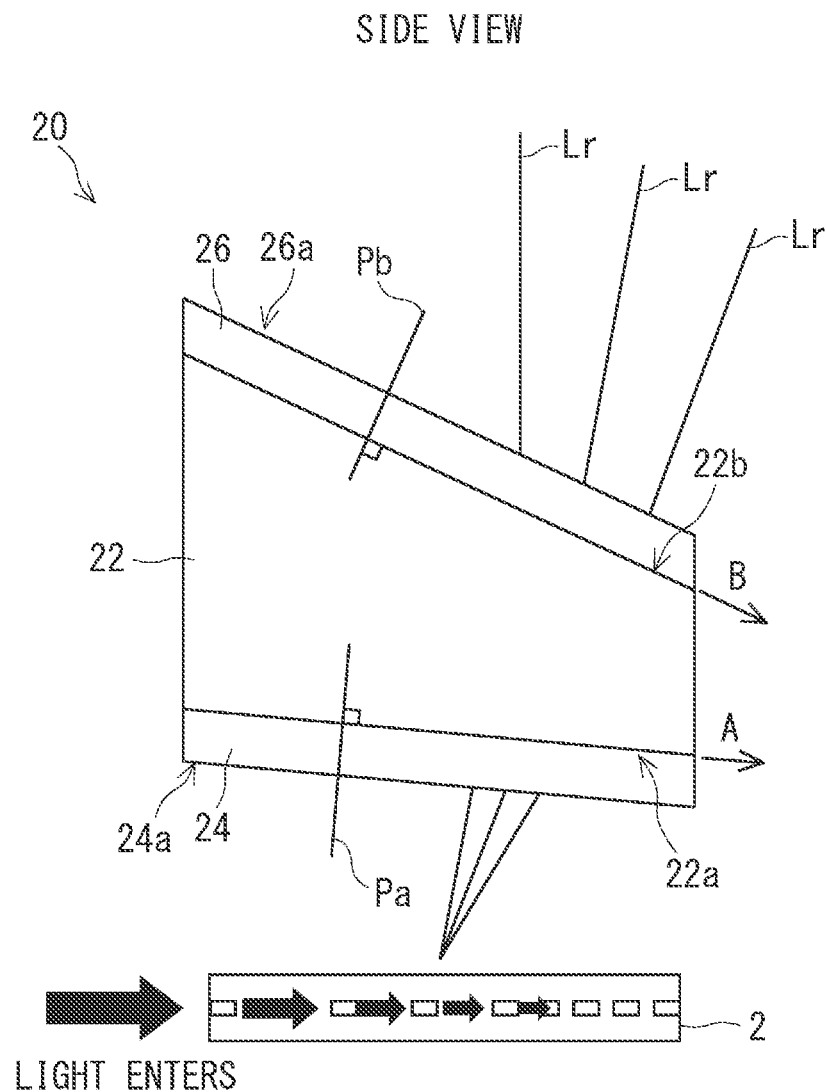
FIG. 11 is a side view showing the light deflection device according to the first embodiment.

FIG. 10 is a perspective view showing a light deflection device 1 according to a first embodiment. FIG. 11 is a side view showing the light deflection device 1 according to the first embodiment. The light deflection device 1 according to first embodiment has a photonic crystal waveguide 2 and a prism lens 20. The photonic crystal waveguide 2 is a waveguide with a diffraction grating periodically having a low-refractive-index region on a high-refractive-index member and is substantially the same as the one shown in FIG. 1.

The prism lens 20 has a prism lens body 22 and cylindrical lenses 24 and 26. The prism lens body 22 has a set of facing planes 22a and 22b (first plane) that are not parallel to each other. Here, the lower plane (on the photonic crystal waveguide 2 side) of the prism lens body 22 is the plane 22a, and the upper plane (on the far side from the photonic crystal waveguide 2) is the plane 22b. Therefore, the planes 22a and 22b are a set of facing planes a mutual distance of which decreases or increases from one end to another end thereof. For example, in FIG. 11, the distance between the plane 22a and the plane 22b decreases from the left end to the right end (the positive direction of the X axis). Conversely, in FIG. 9, the distance between the plane 22a and the plane 22b increases from the right end to the left end (the negative direction of the X axis). The prism lens 20 is installed, with respect to the X axis direction that is the direction of propagation of light, such that the sides in the positive direction of the X axis (downstream sides in the direction of incidence of light) of the plane 22a and the plane 22b tilt to be close to the photonic crystal waveguide 2. It is assumed here that the plane 22a and the plane 22b are perpendicular to the ZX plane. Therefore, it can be said that the prism lens body 22 is a square pole having a surface (indicated by the arrow A in FIG. 10) viewed from the side direction (Y axis direction) as its bottom surface. However, the shape of the prism lens body 22 is not limited to the square pole. Also, the prism lens body 22 is formed such that the distance between the plane 22a and the plane 22b is shorter on the side of the positive direction of the X axis (the downstream side of the direction of incidence of light) than the distance therebetween on the side of the negative direction of the X axis (the upstream side of the direction of incidence of light).

The cylindrical lens 24 is integral to the plane 22a (first plane). The cylindrical lens 26 is integral to the plane 22b (first plane). Therefore, the prism lens 20 is configured such that the cylindrical lenses 24 and 26 are provided on the set of facing planes 22a and 22b that are not parallel to each other. It should be noted that, since the cylindrical lens 24 is integral to the plane 22a, the boundary between the prism lens body 22 and the cylindrical lens 24 is not required to be visually checked by, for example, cutting the prism lens 20. In the same manner, since the cylindrical lens 26 is integral to the plane 22b, the boundary of the prism lens body 22 and the cylindrical lens 26 is not required to be visually checked by, for example, cutting the prism lens 20.

Here, the cylindrical lens 24 is formed such that a cross section shape thereof at a plane Pa perpendicular to the direction of the slope (indicated by the arrow A in FIG. 11) of the plane 22a with respect to the plane 22b (the other plane of the set of planes of the prism lens body 22) has a certain curved shape to be convex against the plane 22a. In other words, the cylindrical lens 24 has a uniform shape in the slope direction indicated by the arrow A. Therefore, a ridge line 24a of the cylindrical lens 24 is parallel to the plane 22a. The slope direction indicated by the arrow A is substantially parallel to the ZX plane. The slope direction indicated by the arrow A is also substantially perpendicular to the line of intersection acquired by crossing of the plane including the plane 22a and the plane including the plane 22b.

Also, the cylindrical lens 26 is formed such that a cross section shape thereof at a plane Pb perpendicular to the direction of the slope (indicated by the arrow B in FIG. 11) of the plane 22b with respect to the plane 22a (the other plane of the set of planes of the prism lens body 22) has a certain curved shape to be convex against the plane 22b. In other words, the cylindrical lens 26 has a uniform shape in the slope direction indicated by the arrow B. Therefore, a ridge line 26a of the cylindrical lens 26 is parallel to the plane 22b. The slope direction indicated by the arrow B is substantially parallel to the ZX plane. The slope direction indicated by the arrow B is also substantially perpendicular to the line of intersection acquired by crossing of the plane including the plane 22a and the plane including the plane 22b.

By being formed as described above, the prism lens 20 functions as a prism that refracts light when viewed from the side direction and functions as a lens combining the two cylindrical lenses 24 and 26 when viewed from the front direction. Therefore, use of the prism lens 20 formed as described above enables the radiated light Lr to be collimated (which suppresses the spread of the radiated light Lr) even when the radiation angle θ is changed (which solves the first problem). Furthermore, the use of the prism lens 20 formed as described above enables the light in an oblique direction radiated from the waveguide 6 to be deflected to light in a direction in vicinity of the directly upward direction (output angle θ'=0°) (which solves the second problem).

Figure 12:
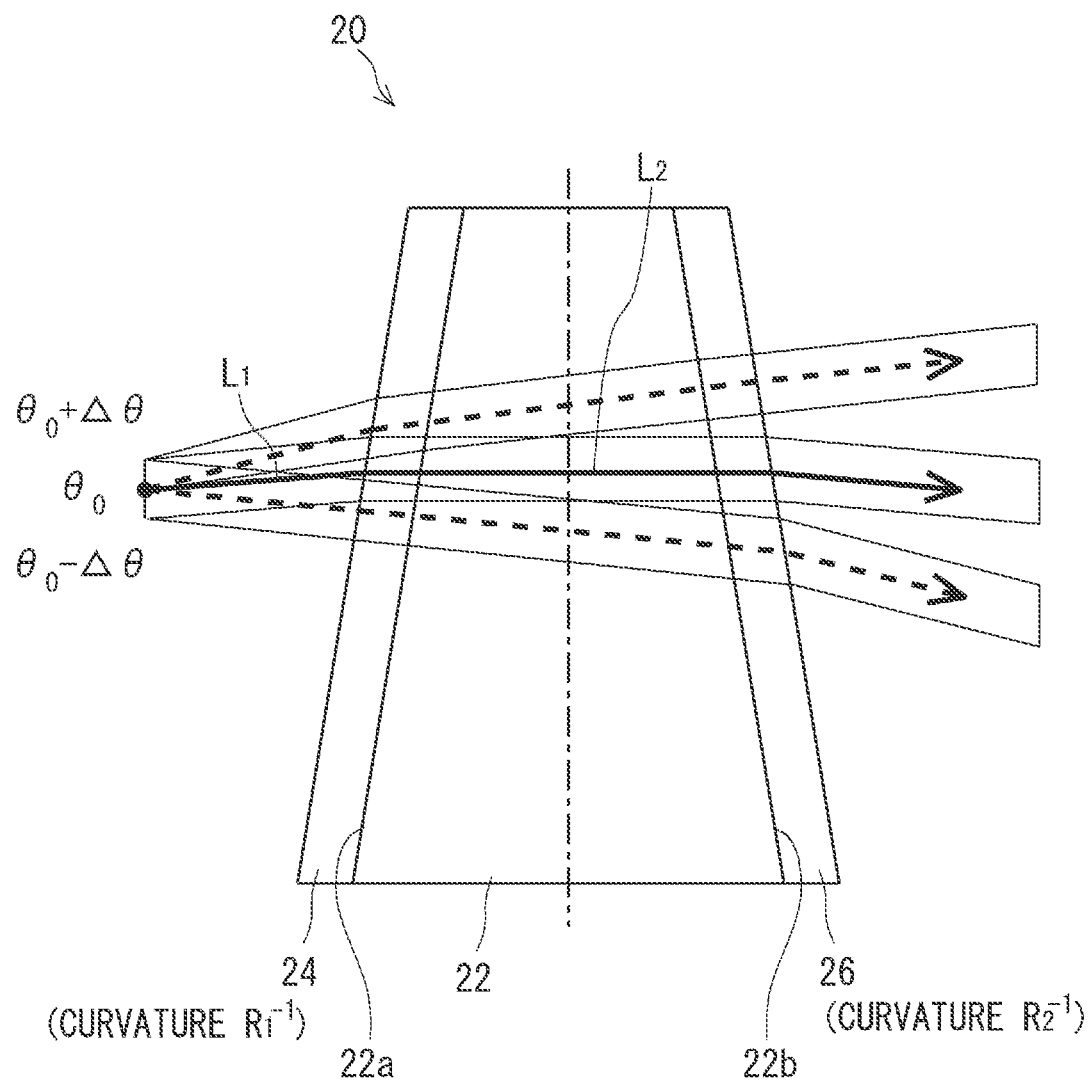
FIG. 12 is a diagram for explaining an operation of a prism lens according to the first embodiment.
Figure 13:
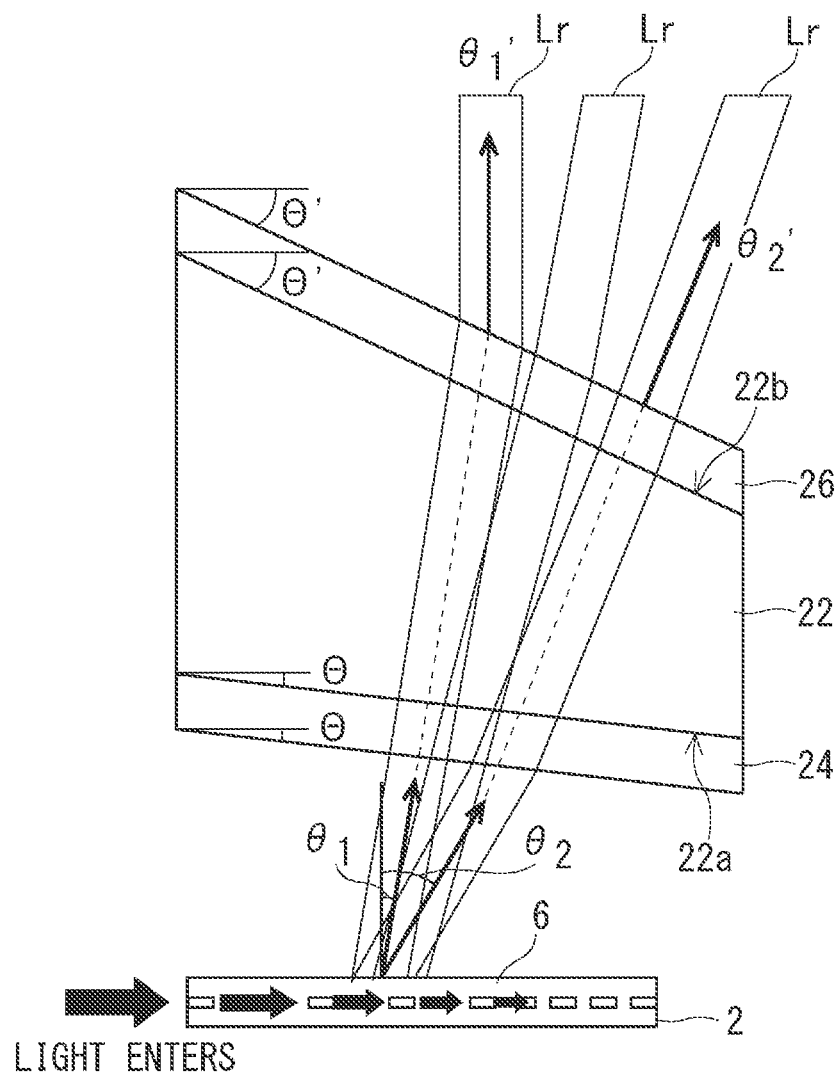
FIG. 13 is a diagram for explaining an operation of the prism lens according to the first embodiment.
Figure 14:
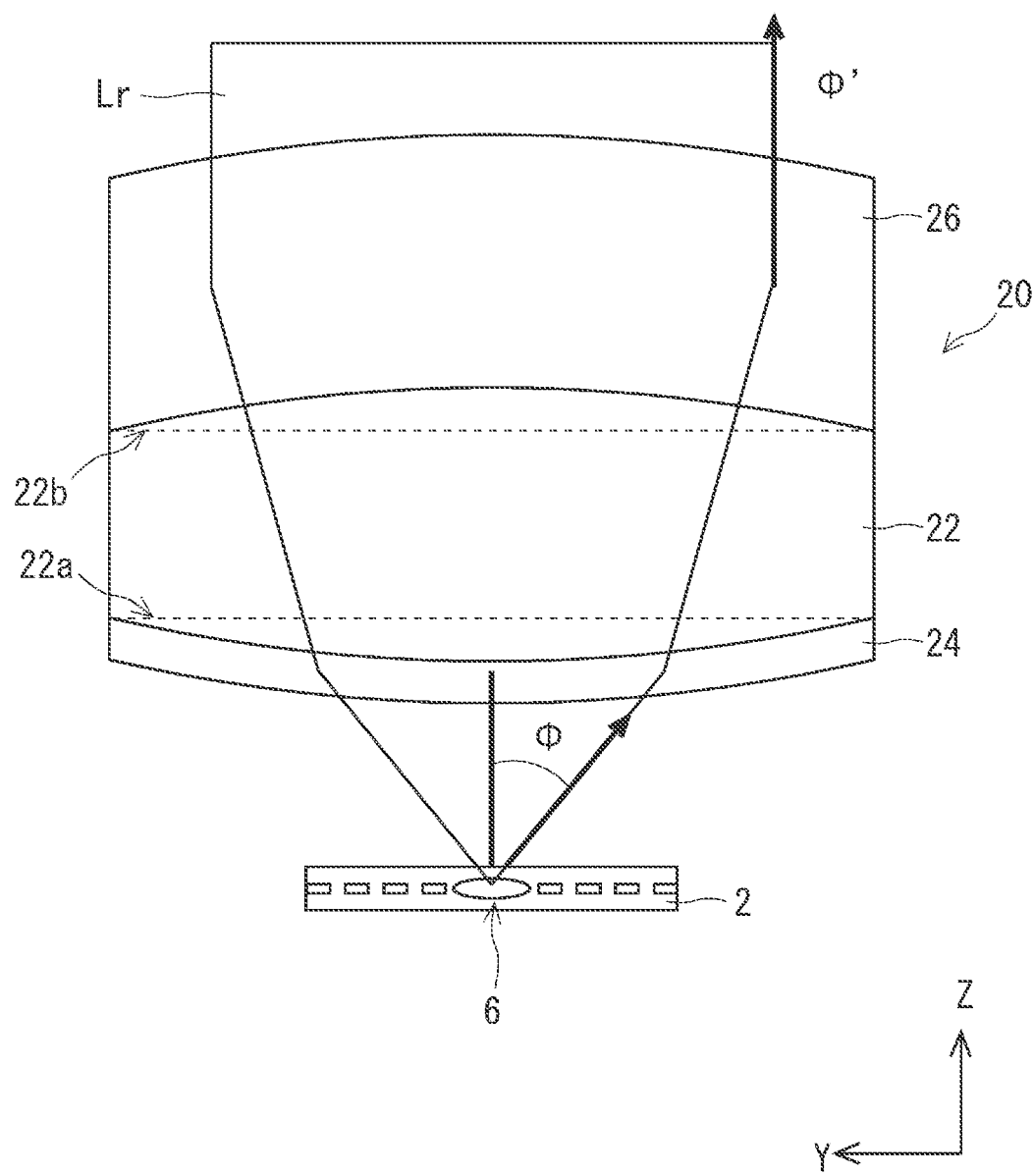
FIG. 14 is a diagram for explaining an operation of the prism lens according to the first embodiment.

FIG. 12 to FIG. 14 are diagrams for explaining operations of the prism lens 20 according to the first embodiment. FIG. 12 is a diagram for explaining the principle that the radiated light Lr can be collimated even when the radiation angle θ is changed. FIG. 12 is a diagram acquired by rotating the right side of the prism lens 20 shown in FIG. 11 to the top side, and, for clear illustration, the prism lens 20 (the prism lens body 22) is drawn to have an angle to be horizontally symmetrical.

A state is considered in which, referring to FIG. 12, when a light beam slightly upward from the horizontal line enters from the left direction of the drawing to the prism lens 20, the direction of the light beam is changed to be immediately lateral within the prism lens 20, and a slightly downward light beam exits from the right side to be symmetrical to the direction of the light beam on the left side. It is assumed here that when the input angle is 60, the output angle is $-\theta_0$. It is further assumed that the curvature of the cylindrical lens 24 is $R_1^{-1}$ (radius of curvature $R_1$), the curvature of the cylindrical lens 26 is $R_2^{-1}$ (radius of curvature $R_2$), and these curvatures are equal ($R_1^{-1} = R_2^{-1}$). The length from the light source to the lens (the length corresponding to the optical path length) is $L_1$, and the length in the lens (the length corresponding to the optical path length) is $L_2$. In this case, it is understood that the two lenses can be combined to acquire a system that collimates light spreading in the Φ direction (the depth direction of the drawing). In other words, since the absolute value of the input angle and the absolute value of the output angle are equal and the curvature of the cylindrical lens 24 and the curvature of the cylindrical lens 26 are equal, the radius of curvature in the direction that the light beam enters is equal to the radius of curvature in the direction that the light beam exits (where the radius of curvature is R'). Therefore, by setting the length $L_1$ such that the position of the light source at that time agrees with the focus on the cylindrical lens 24 side of the prism lens 20, the light beam to be output from the cylindrical lens 26 can be collimated.

Next, a condition for acquiring an input angle of $\theta_0 + \Delta\theta$ is considered. In this case, since the length $L_1$ from the light source to the lens is slightly longer than that with $\theta_0$ and the length $L_2$ in the lens is slightly shorter than that with $\theta_0$, they act in the directions that cancel each other. Also, since the input angle to the cylindrical lens 24 is slightly large, the curvature to the direction of input to the cylindrical lens 24 is larger than that with $\theta_0$ (the radius of curvature is smaller than R'). Conversely, since the angle of input to the cylindrical lens 26 is slightly small, the curvature to the direction of input to the cylindrical lens 26 is small (the radius of curvature is larger than R'). Therefore, the curvatures (the radii of curvatures) also act in the directions that cancel each other. Therefore, since displacement of the focus is suppressed, the collimating condition with $\theta_0$ can be maintained as a result. The same is true for the case where $\theta_0 - \Delta\theta$, and displacement of the focus is suppressed even when the input angle is changed to either direction. Therefore, the collimating condition with $\theta_0$ can be maintained. In other words, by positioning the light source with $\theta_0$ to match the focus, the position of the light source and the focus are substantially matched even with $\theta_0 \pm \Delta\theta$.

However, a certain range of $\Delta\theta$ satisfies the collimating condition. When $\theta_0 + \Delta\theta$ in FIG. 12, the angle of the light that enters the cylindrical lens 26 is nearly vertical. When this angle exceeds the vertical angle, the curvature starts to increase again, and the cancel as described above does not occur. On the other hand, when $\theta_0 - \Delta\theta$ and when the angle of light that enters the cylindrical lens 24 is downward relative to the vertical angle, the cancel does not occur. Therefore, $2\Delta\theta$ is required to be smaller than the angle formed by the two planes 22a and 22b of the prism lens body 22.

FIG. 13 is a side view showing radiated light Lr when the radiation angle θ for radiating light from the waveguide 6 is changed. FIG. 14 is a front view showing radiated light Lr when the radiation angle θ for radiating light from the waveguide 6 is changed. As shown in FIG. 13, it is assumed that θ changes between $\theta_1$ and $\theta_2$. It is further assumed that the angle of output of light from the prism lens 20 is $\theta_1'$ when the radiation angle of light from the waveguide 6 is $\theta_1$. It is further assumed that the angle of output of light from the prism lens 20 is $\theta_2'$ when the radiation angle of light from the waveguide 6 is $\theta_2$. Here, as shown in FIG. 13, the slope angle formed by the plane 22a relative to the XY plane (waveguide 6) is Ə, and the slope angle formed by the plane 22b relative to the XY plane (waveguide 6) is Θ'. In this case, by adjusting the slope angle Θ and the slope angle Θ', $\theta_1' = 0$ can be satisfied with the radiation angle $\theta_1$ because of the effect of the prism. Therefore, the prism lens 20 according to the first embodiment can solve the aforementioned second problem. In other words, the prism lens 20 according to the first embodiment can deflect radiated light in an oblique direction radiated from the waveguide 6 to light in the directly upward direction (output angle $\theta' = 0°$).

As shown in FIG. 14, when the radiation angle θ from the waveguide 6 is changed between $\theta_1$ and $\theta_2$, the radiated light Lr can be collimated because displacement of the focus is suppressed as described above with reference to FIG. 12. More specifically, as apparent from FIG. 13, when the radiation angle θ is small, the radiated light Lr enters the cylindrical lens 24 substantially vertically. As the radiation angle θ increases, the angle of input of the radiated light Lr to the cylindrical lens 24 decreases (far away from 90°). Therefore, as the radiation angle θ increases, the radius of curvature of the cylindrical lens 24 relative to the direction of input of the radiated light Lr decreases. On the other hand, when the radiation angle θ is large, the radiated light Lr enters the cylindrical lens 26 substantially vertically. As the radiation angle θ decreases, the angle of input of the radiated light Lr to the cylindrical lens 26 decreases (far away from 90°). Therefore, as the radiation angle θ increases, the radius of curvature of the cylindrical lens 26 relative to the direction of input of the radiated light Lr increases. As apparent from FIG. 13, as the radiation angle θ increases, the optical path length $L_2$ within the prism lens 20 decreases while the optical path length $L_1$ from the waveguide 6 to the cylindrical lens 24 increases. Thus, even when the radiation angle θ is changed, displacement of the focus is suppressed.

In other words, since the condition described above with reference to FIG. 12 is satisfied, the spread angle Φ' of the radiated light Lr (output beam) in the lateral direction viewed from the front direction can be suppressed to the vicinity of 0°. Therefore, the prism lens 20 according to the first embodiment can solve the aforementioned first problem. In other words, the prism lens 20 according to the first embodiment can suppress the increase of the spread angle Φ' of the radiated light Lr with respect to the wide radiation angle θ.

The fact that displacement of the focus is suppressed is now described schematically by using mathematical expressions. It is assumed that it is set such that the output beam is collimated with a certain radiation angle $\theta_0$. It is further assumed that the radius of curvature in the cylindrical lens 24 with respect to the direction that the light radiated at a certain radiation angle θ enters the cylindrical lens 24 is $r_1$ ($\leq R_1$), and the radius of curvature with respect to the direction that the light enters the cylindrical lens 26 is $r_2$ ($\leq R_2$). The length in this case from the light source to the lens is $L_1$ and the length in the lens is $L_2$. In this case, the lens maker's equation is expressed as in the following Expression (1).

[Expression 1]

$$\frac{1}{f} = (n-1)\left(\frac{1}{r_1} + \frac{1}{r_2}\right) - \frac{L_2(n-1)^2}{nr_1 r_2} \quad (1)$$

where f is a focal length, and n is a refractive index of the prism lens 20.

From the expression for the thick lens focal length, $L_1$ is expressed as in the following Expression (2).

[Expression 2]

$$L_1 = f\left\{1 - \frac{L_2(n-1)}{nr_2}\right\} \quad (2)$$

From Expression (1) and Expression (2), when $r_1 = r_2 = r_0$, $L_1$ is expressed as in the following Expressions (3) and (4).

[Expression 3]

$$L_1 = \frac{r_0}{2(n-1)}\left(1 - \frac{A}{1-A}\right) \quad (3)$$

where

[Expression 4]

$$A = \frac{n-1}{2n}\frac{L_2}{r_0} \quad (4)$$

If Expressions (3) and (4) are satisfied, light can be collimated.

As the radiation angle θ increases ($\theta_1 \to \theta_2$ in FIG. 13), the length $L_1$ from the light source to the prism lens 20 increases, $r_1$ in the cylindrical lens 24 decreases, the length $L_2$ that light propagates in the lens decreases, and $r_2$ in the cylindrical lens 26 increases. This state is considered as being acquired from changes of $r_1$, $r_2$, $L_1$ and $L_2$ to $r_1 - \Delta r_1$, $r_2 + \Delta r_2$, $L_1 + \Delta L_1$ and $L_2 - \Delta L_2$, respectively. It is assumed here that the parameters with Δ are minute. Also, $r_1 = r_2 = r_0$ is set here and is approximate to $r_1 \approx r_0 - \Delta r$ and $r_2 \approx r_0 + \Delta r$. By substituting the changes of the parameters above to Expressions (1) and (2) and further deleting the higher-order terms equal to or higher than squares of the parameters with Δ because they are sufficiently small, an approximate expression expressed by the following Expression (5) is finally acquired.

[Expression 5]

$$L_1 + \Delta L_1 \approx \frac{r_0}{2(n-1)}\left[\left(1 - \frac{A}{1-A}\right) + \frac{A}{1-A}\left(\frac{1}{1-A}\frac{\Delta L_2}{L_2} + 2\frac{\Delta r}{r_0}\right)\right] \quad (5)$$

Here, it is apparent from Expression (3) that $L_1$ on the left side corresponds to the first term within the parentheses on the right side. Thus, the following Expression (6) is derived, and if $\Delta L_1$, $\Delta L_2$ and $\Delta r$ behave to satisfy it, the collimating state is maintained even when the radiation angle θ of light changes. Since $\Delta L_1$, $\Delta L_2$ and $\Delta r$ are all positive, $\Delta L_1$, $\Delta L_2$ and $\Delta r$ can behave so as to satisfy Expression (6) even when the radiation angle θ of light changes.

[Expression 6]

$$4n(1-A)\frac{\Delta L_1}{L_2} - \frac{1}{1-A}\frac{\Delta L_2}{L_2} - 2\frac{\Delta r}{r_0} \approx 0 \quad (6)$$

Here, all of $L_1, \Delta L_1, L_2, \Delta L_2, \Delta r$ and A can be expressed by the radiation angle θ of the light, the upper and lower angles Θ, Θ' of the prism lens 20, the refractive index n of the prism lens 20, the thickness in the Z axis direction of the prism lens 20, and the distance from the light source to the prism lens 20, in FIG. 13. Therefore, by substituting them to Expression (6), a condition for those structure parameters can be derived. Here, by defining the refractive index n and the range $\theta_1$ to $\theta_2$ of the radiation angle of the light from the photonic crystal waveguide 2 as fixed values and defining a representative angle in the range $\theta_1$ to $\theta_2$ as $\theta_0$ representing a symmetrical ray trajectory as shown in FIG. 12, the corresponding Θ, Θ' for solving the second problem can be determined. By applying this to the condition for the aforementioned structure parameters, the thickness in the Z axis direction of the prism lens 20 and the distance from the light source to the prism lens 20 can be given as constant multiplications of $r_0$.

Second Embodiment

Next, a second embodiment is described.

Figure 15:
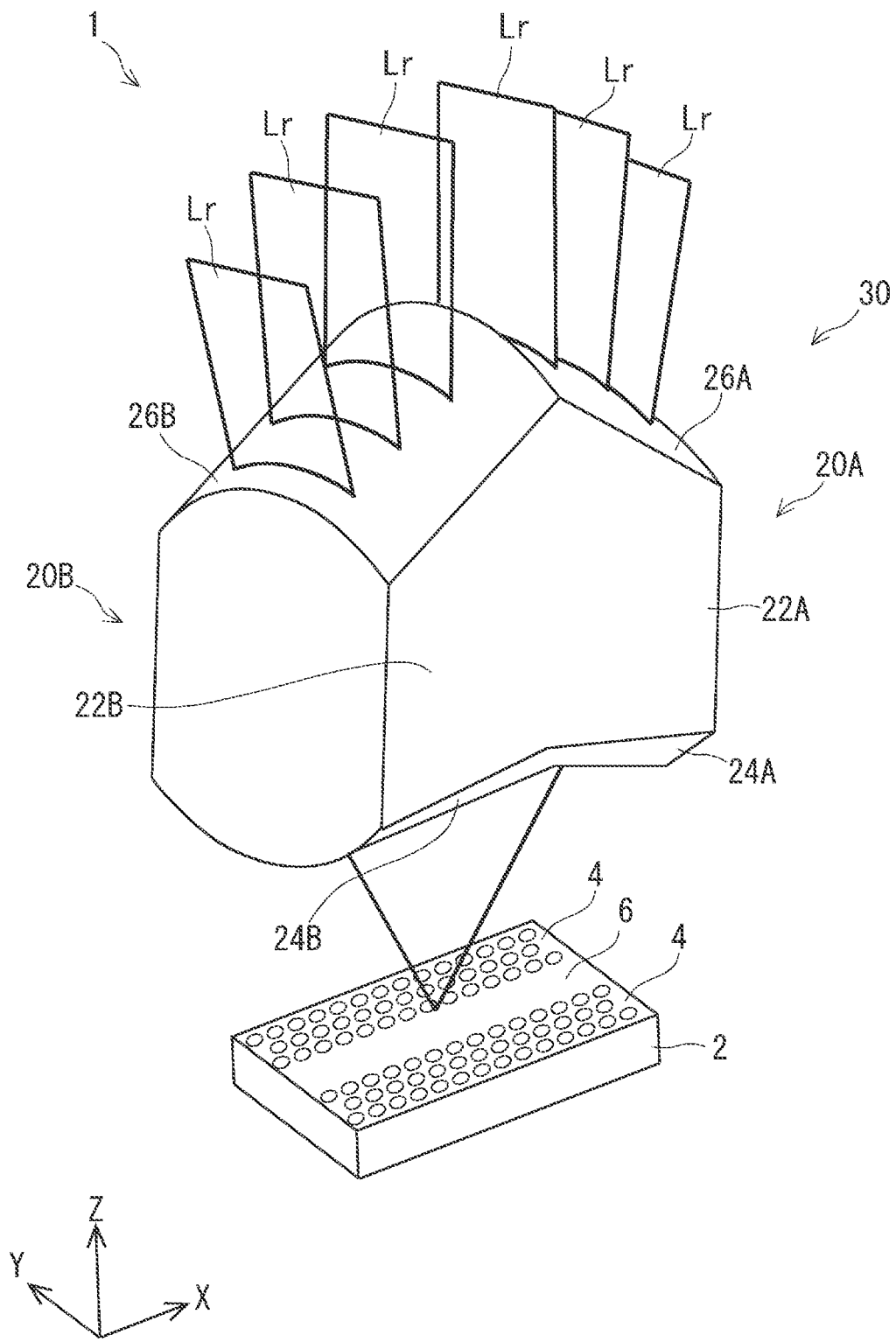
FIG. 15 is a perspective view showing a light deflection device according to a second embodiment.
Figure 16:
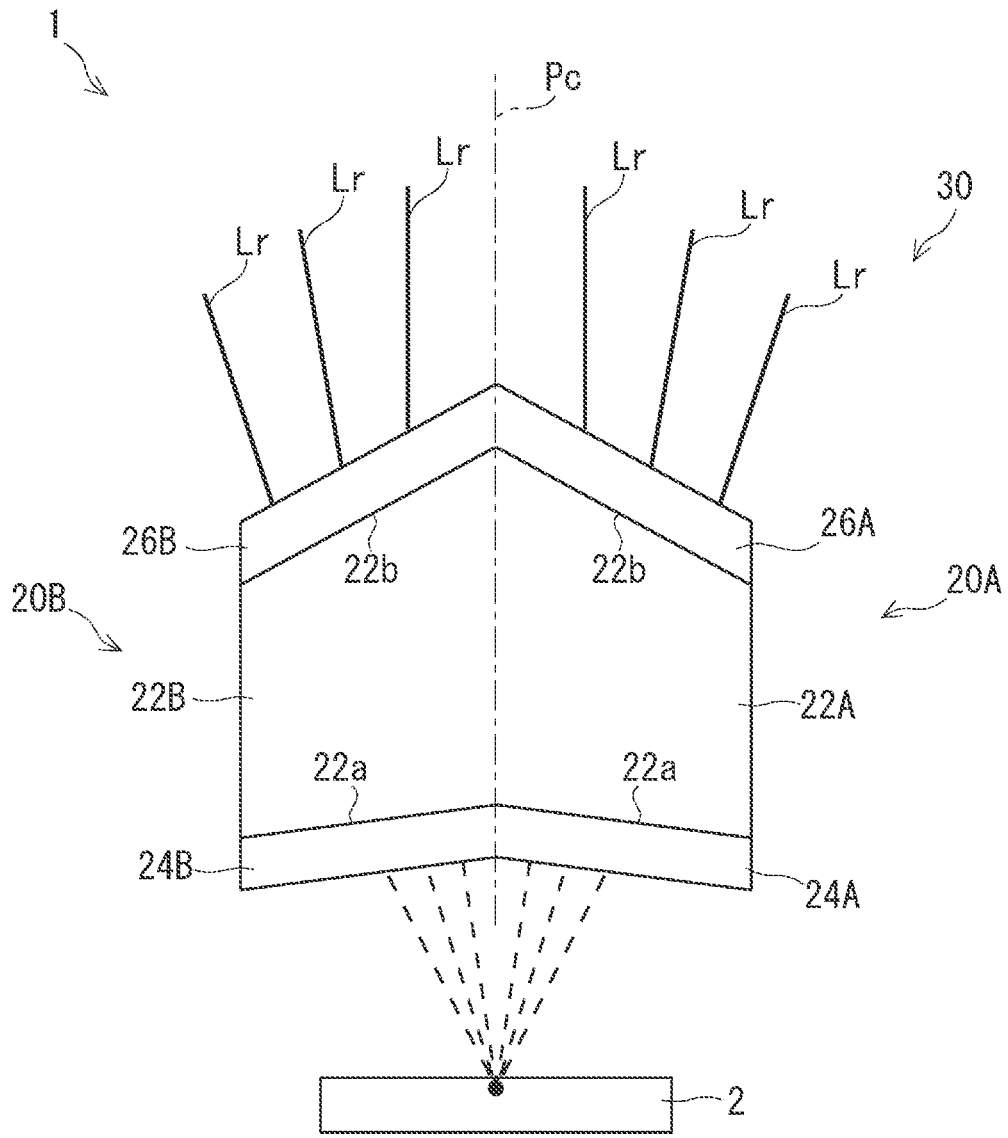
FIG. 16 is a side view showing the light deflection device according to the second embodiment.

FIG. 15 is a perspective view showing a light deflection device 1 according to the second embodiment. FIG. 16 is a side view showing the light deflection device 1 according to the second embodiment. The light deflection device 1 according to the first embodiment has a photonic crystal waveguide 2 and a prism lens 30. The prism lens 30 according to the second embodiment is formed by combining (coupling) two prism lenses 20 according to the first embodiment.

More specifically, the prism lens 30 is formed by mutually coupling planes having a larger area (planes having longer distances between the plane 22a and the plane 22b) of two planes substantially parallel to the YZ plane of the prism lens 20. Thus, the prism lens 30 has a shape that bends in vicinity of the center in the X axis direction. In other words, the prism lens 30 according to the second embodiment is formed by combining the prism lens bodies 22 each having the cylindrical lenses 24 and 26 such that the slope directions of the planes 22a and 22b of the prism lens bodies 22 are symmetrical to each other.

The prism lens 30 has a prism lens 20A and a prism lens 20B. The prism lens 20A and the prism lens 20B have substantially the same shape as that the prism lens 20 according to the first embodiment. Therefore, the prism lens 20A has a prism lens body 22A, a cylindrical lens 24A. and a cylindrical lens 26A. The prism lens 20B has a prism lens body 22B, a cylindrical lens 24B, and a cylindrical lens 26B. The prism lens bodies 22A and 22B correspond to the prism lens body 22. The cylindrical lenses 24A and 24B correspond to the cylindrical lens 24. The cylindrical lenses 26A and 26B correspond to the cylindrical lens 26.

The cylindrical lens 24A is integral to the plane 22a of the prism lens body 22A. The cylindrical lens 26A is integral to the plane 22b of the prism lens body 22A. The cylindrical lens 24B is integral to the plane 22a of the prism lens body 22B. The cylindrical lens 26B is integral to the plane 22b of the prism lens body 22B. Here, the slope direction of the plane 22a of the prism lens body 22A and the slope direction of the plane 22a of the prism lens body 22B are symmetrical about a boundary plane Pc between the prism lens 20A and the prism lens 20B. In the same manner, the slope direction of the plane 22b of the prism lens body 22A and the slope direction of the plane 22b of the prism lens body 22B are symmetrical about the boundary plane Pc between the prism lens 20A and the prism lens 20B.

Figure 17:
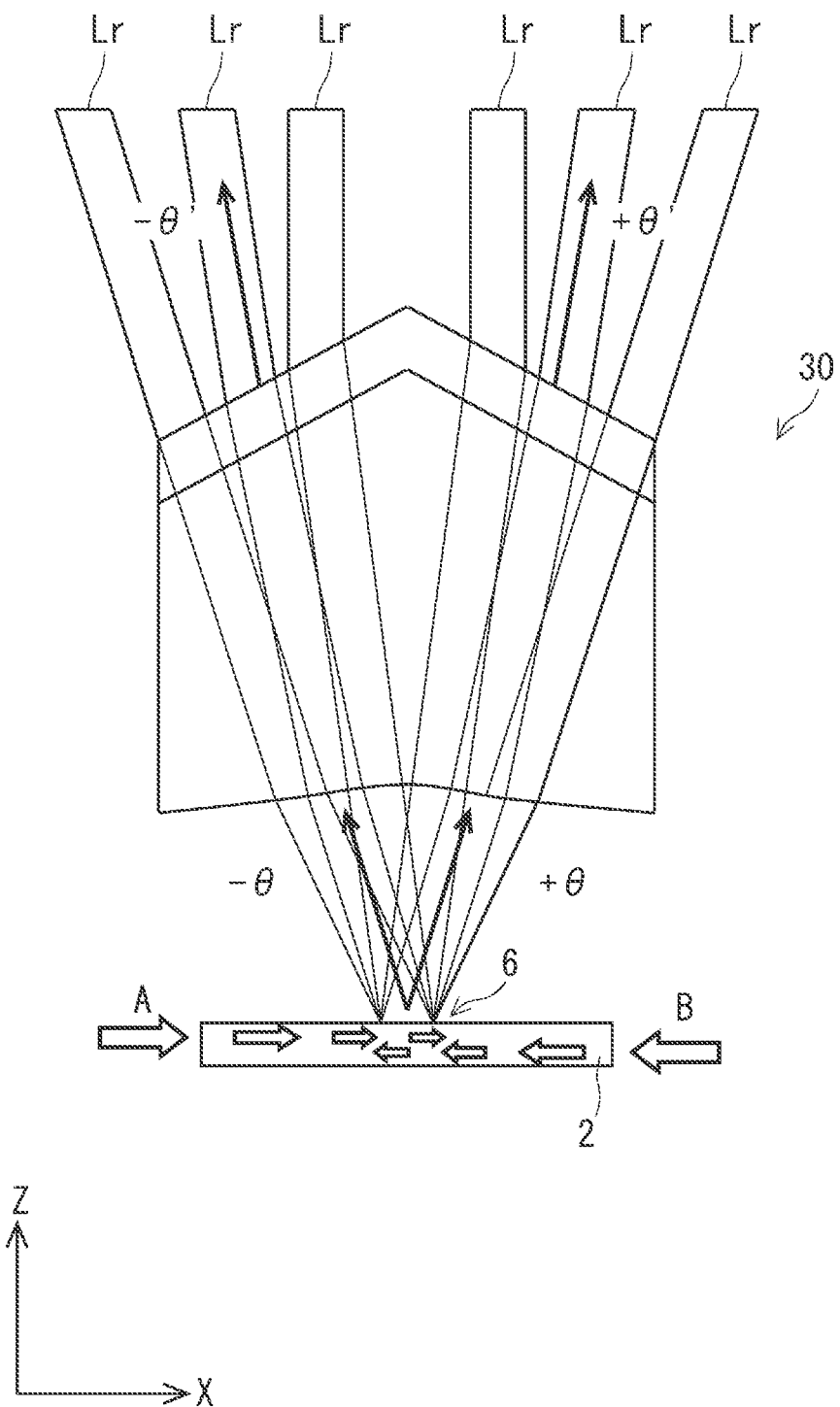
FIG. 17 shows a state that radiated light is deflected by a prism lens according to the second embodiment.

FIG. 17 shows a state that the radiated light Lr is deflected by the prism lens 30 according to the second embodiment. When light enters from the direction indicated by the arrow A, light is radiated in the $+\theta$ direction from the waveguide 6. As described above, the radiated light Lr at a certain radiation angle $\theta$ is output at an output angle $\theta'=0$. When light enters from the direction indicated by the arrow B that is the opposite direction of the arrow A, light is output in the $-\theta$ direction that is the opposite direction (negative direction) of the $+\theta$ direction from the waveguide 6. As described above, the radiated light Lr at the certain radiation angle $\theta$ is output at the output angle $\theta'=0$. Therefore, when the radiation angle $\theta$ is $-\theta_2$ to $+\theta_2$ (see FIG. 13), the radiated light Lr can be continuously deflected to $-\theta_2$ to $0°$ to $+\theta_2$. In other words, by adopting the prism lens 30 according to the second embodiment, the radiated light Lr can be deflected such that the output angle $\theta'$ is in the positive or negative direction in vicinity of $0°$.

Figure 18:
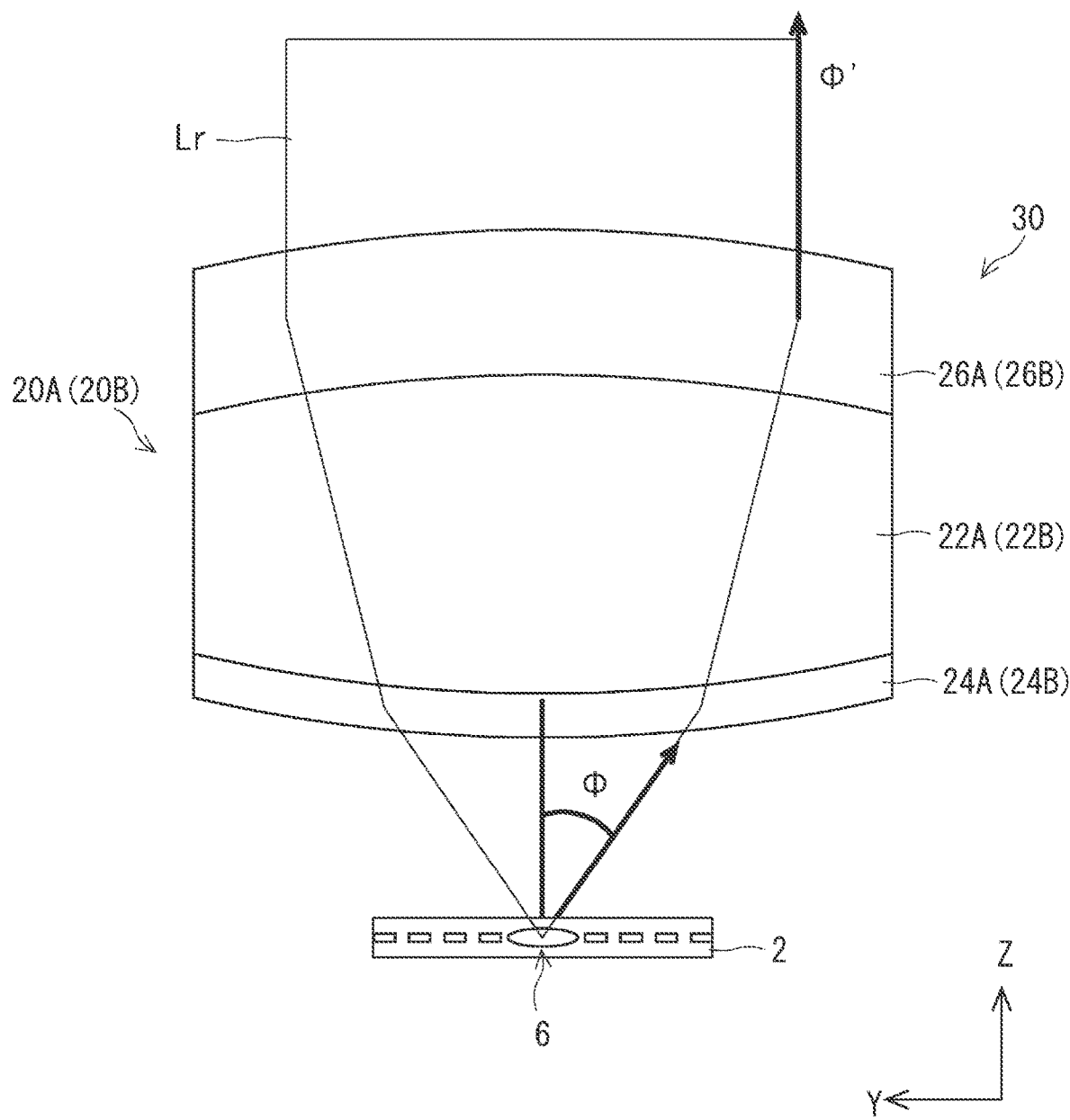
FIG. 18 is a front view showing a state that radiated light is collimated by the prism lens according to the second embodiment.

FIG. 18 is a front view showing a state that the radiated light Lr is collimated by the prism lens 30 according to the second embodiment. As described above, since the prism lens 30 according to the second embodiment is formed by combining the prism lenses 20 according to the first embodiment, the prism lens 30 can collimate the radiated light Lr in the same manner as the prism lens 20 according to the first embodiment. In other words, the spread angle $\Phi'$ of the radiated light Lr (output beam) in the lateral direction viewed from the front direction can be suppressed to the vicinity of $0°$. The prism lens 30 according to the second embodiment can collimate the radiated light Lr in both cases where the radiation angle $\theta$ is the positive direction $(+\theta)$ and the negative direction $(-\theta)$.

Figure 19:
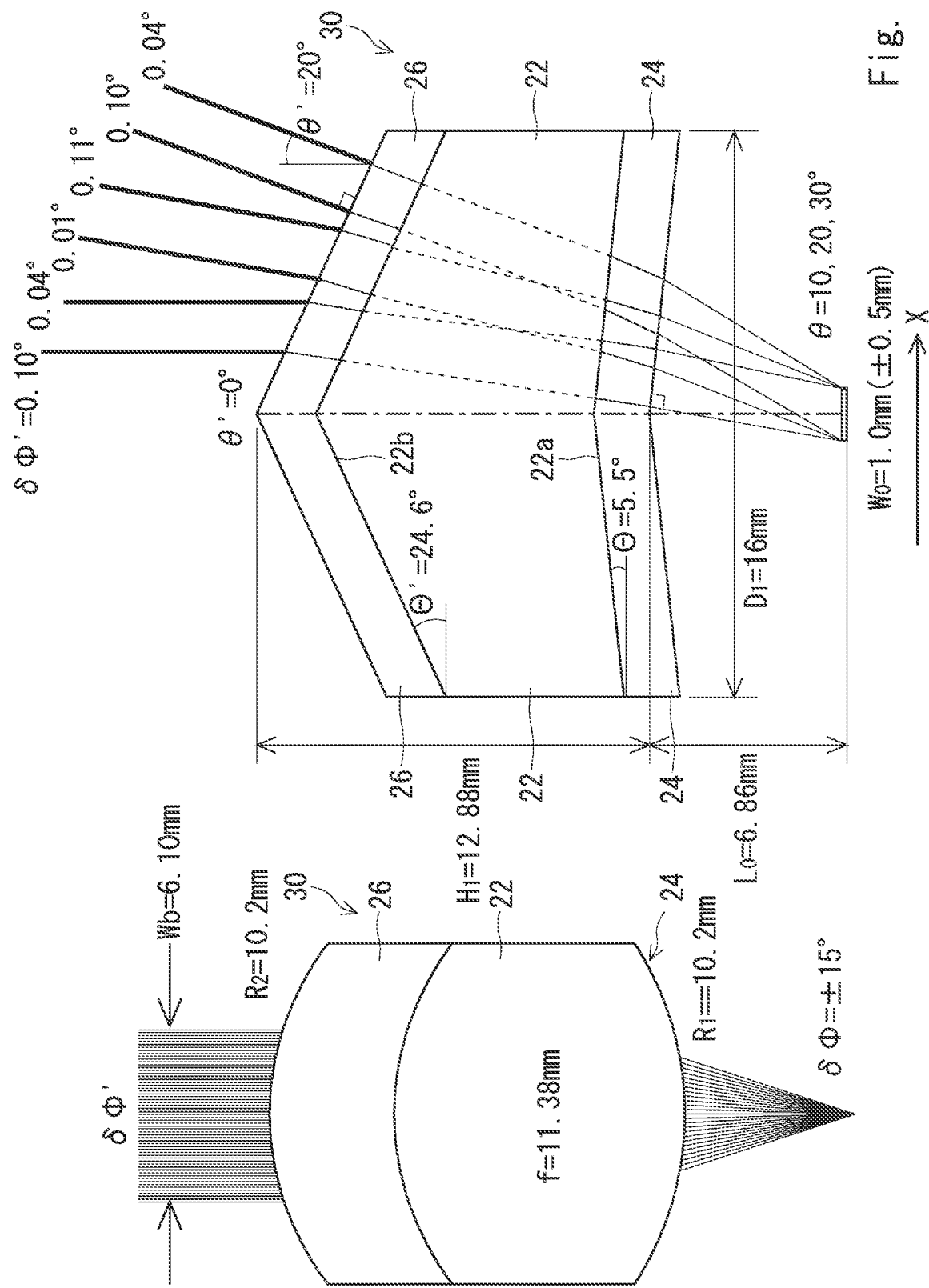
FIG. 19 shows a first design example of the prism lens according to the second embodiment.

FIG. 19 shows a first design example of the prism lens 30 according to the second embodiment. The left diagram of FIG. 19 is a front view of the prism lens 30, and the right diagram of FIG. 19 is a side view of the prism lens 30. In FIG. 19, the prism lens body 22A and the prism lens body 22B are not distinguished. Therefore, the prism lens bodies 22A and 22B of the prism lens 30 are indicated as "prism lens body 22", and the cylindrical lenses 24A and 24B are indicated as "cylindrical lens 24", and the cylindrical lenses 26A and 26B are indicated as "cylindrical lens 26".

The refractive index of the prism lens 30 is n=1.5. The slope angle of the plane 22a is $\Theta=5.5°$, and the slope angle of the plane 22b is $\Theta'=24.6°$. The radius of curvature of the cylindrical lens 24 is $R_1=10.2$ mm, and the radius of curvature of the cylindrical lens 26 is $R_2=10.2$ mm. The focal length of the prism lens 30 is f=11.38 mm. The entire length (length in the X axis direction) of the prism lens 30 is $D_1=16$ mm, and its height at the center is $H_1=12.88$ mm. The distance from the waveguide 6 to the center of the prism lens 30 is $L_0=6.86$ mm. The radiation opening width of the waveguide 6 is $W_0=1.0$ mm and is ±0.5 mm about X=0. The radiation angles $\theta$ are 10, 20, 30°. The radiation spread angle is $\Delta\Phi=\pm15°$ (=30°). A simulation was performed under these conditions.

In this case, the beam width of the output light is Wb=6.1 mm. The output angle $\theta'$ in the negative end part of the radiation opening width with $\theta=10°$ is $0°$. The output angle $\theta'$ in the positive end part of the radiation opening width with $\theta=30°$ is $20°$. When the full width at half maximum (half width) of the distribution of the spread angle $\Phi$ is $\delta\Phi'$, the full widths at half maximum in the negative end part of the radiation opening width with $\theta=10, 20, 300$ are $\delta\Phi'=0.10$, 0.01, 0.10°, respectively. In the same manner, the full widths at half maximum in the positive end part of the radiation opening width with $\theta=10, 20, 300$ are $\delta\Phi'=0.04, 0.11, 0.04°$, respectively. Here, when the cylindrical lens 10 shown in FIG. 1 is used, approximately $\delta\Phi'=0.8°$ is acquired. From this, it is understood that, by using the prism lens according to this embodiment, the output beam can be well collimated.

It should be noted that the prism lens according to this embodiment is formed to have a shape that changes in the direction along the direction of light propagation (X axis direction). On the other hand, as shown in FIG. 19, when the radiation opening width (waveguide length) of the waveguide 6 is approximately 1.0 mm, the light source is positioned within the range of the radiation opening width. Therefore, with the light source at some positions, there is possibility that the collimating condition is not satisfied (as described above, this is also apparent from the fact that the spread angle $\Phi'$ of the output beam (the full width at half maximum $\delta\Phi'$) differs between the radiated light from the positive end part of the radiation opening width and the radiated light from the negative end part). This can be significant when the size of the prism lens is close to the waveguide length. On the other hand, the light source is approximated to one by sufficiently increasing the size of the prism lens relative to the waveguide length and increasing the distance between the light source and the prism lens. Thus, the possibility that the collimating condition is satisfied is increased independently from the radiation angle $\theta$.

Figure 20:
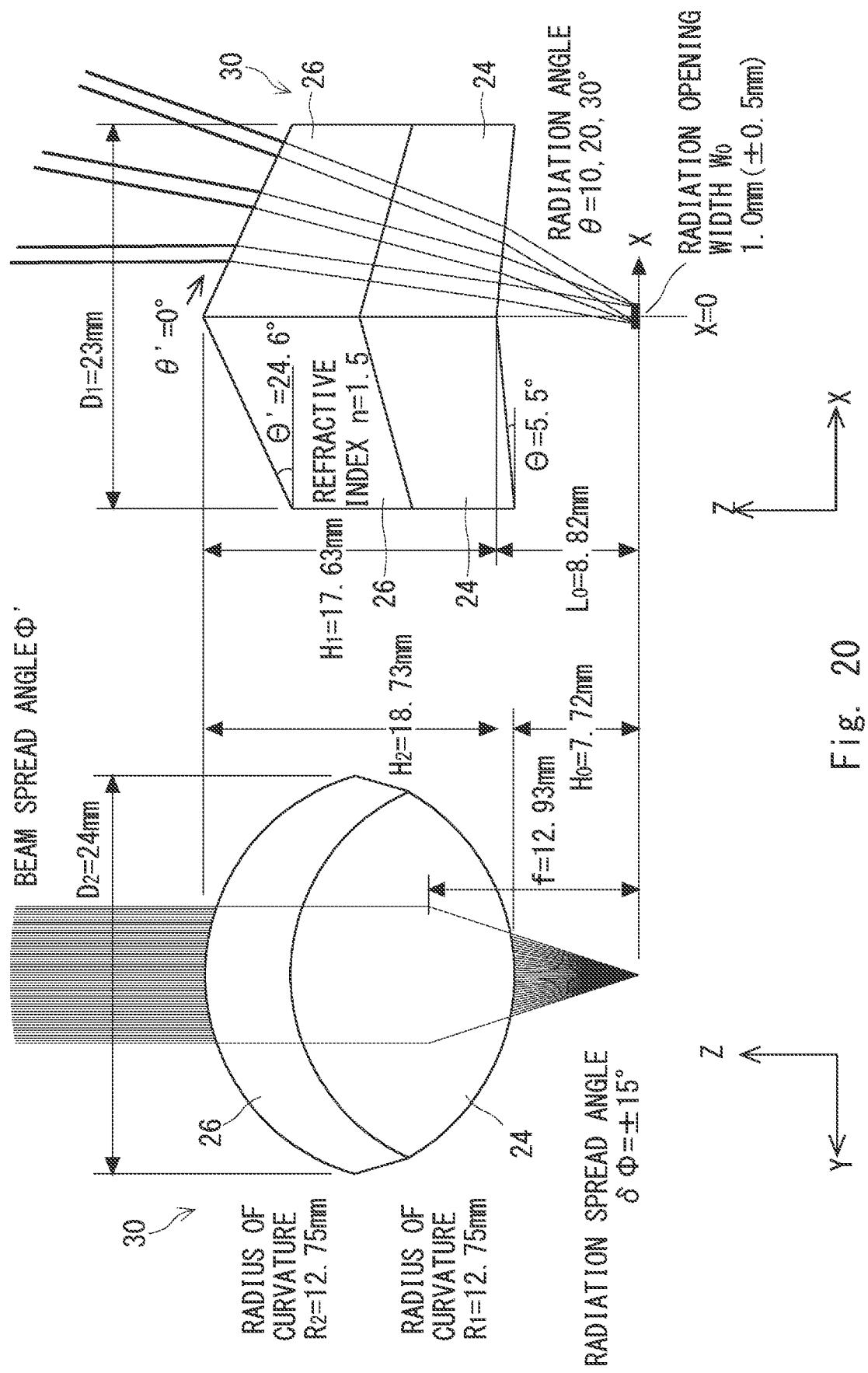
FIG. 20 shows a second design example of the prism lens according to the second embodiment.

FIG. 20 shows a second design example of the prism lens 30 according to the second embodiment. The left diagram of FIG. 20 is a front view of the prism lens 30, and the right diagram of FIG. 20 is a side view of the prism lens 30. Like the example in FIG. 19, the prism lens body 22A and the prism lens body 22B are not distinguished in FIG. 20. Also, in FIG. 20, the planes 22a and 22b of the prism lens body 22 are not clearly shown.

The refractive index of the prism lens 30 is n=1.5. The slope angle of the plane 22a (slope angle of the ridge line of the cylindrical lens 24) is $\Theta=5.5°$, and the slope angle of the plane 22b (slope angle of the ridge line of the cylindrical lens 26) is $\Theta'=24.6°$. The radius of curvature of the cylindrical lens 24 is $R_1=12.75$ mm, and the radius of curvature of the cylindrical lens 26 is $R_2=12.75$ mm. The focal length of the prism lens 30 is f=12.93 mm. The entire length (length in the X axis direction) of the prism lens 30 is $D_1=23$ mm, and its height at the center is $H_1=17.63$ mm. The length in the width direction (length in the Y axis direction) of the prism lens 30 is $D_2=24$ mm. The difference in height between the bottommost part of the prism lens 30 and the waveguide 6 is $H_0=7.72$ mm. The difference in height between the highest part and the bottommost part of the prism lens 30 is $H_2=18.73$ mm. The distance from the waveguide 6 to the center of the prism lens 30 is $L_0=8.82$ mm. The radiation opening width of the waveguide 6 is $W_0=1.0$ mm and is ±0.5 mm about X=0. The radiation angles $\theta$ are 10, 20, 30°. The radiation spread angle is $\delta\Phi=\pm15°$ (=30°). A simulation was performed under these conditions. In this case, as shown in FIG. 20, it is conceivable that the output angle $\theta'=0$ can be realized with the radiation angle $\theta=100$.

Figure 21:
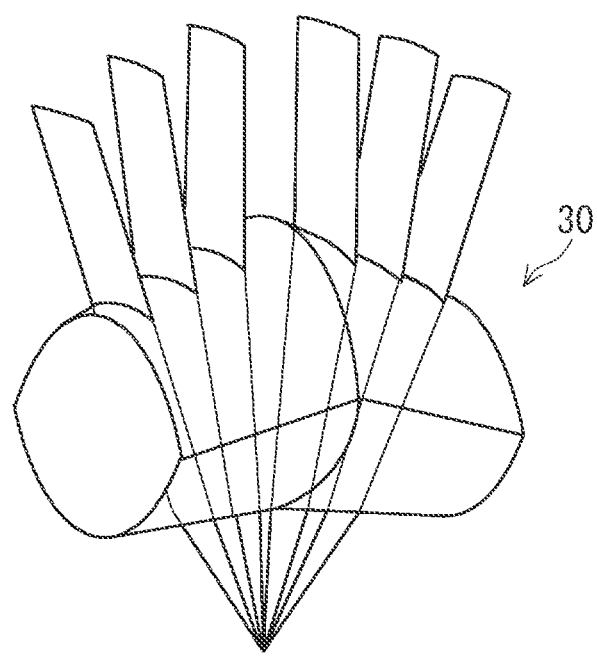
FIG. 21 shows a simulation result when light is radiated at various angles in the second design example of the prism lens shown in FIG. 20.
Figure 22:
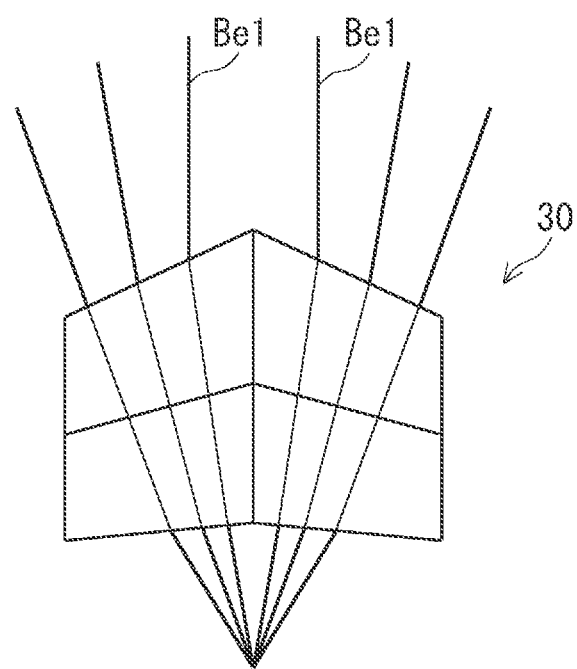
FIG. 22 shows a simulation result when light is radiated at various angles in the second design example of the prism lens shown in FIG. 20.

FIGS. 21 to 24 show simulation results in a case where light is radiated at various angles in the second design example of the prism lens 30 shown in FIG. 20. FIGS. 21 and 22 show a simulation result in a case where light is radiated at various angles from a single radiation position in the waveguide 6 to both directions (the positive direction (+$\theta$) and negative direction (–$\theta$) of the radiation angle $\theta$). FIG. 21 is a perspective view of the prism lens 30, and FIG. 22 is a side view of the prism lens 30. As shown in FIG. 21, it can be seen that output beams are collimated by using the prism lens 30 according to the second design example even when light is radiated at various angles. Also, as shown in FIG. 22, it can be seen that output beams indicated by the arrow Be1 are output in the directly upward direction ($\theta'=0$) by using the prism lens 30 according to the second design example.

Figure 23:
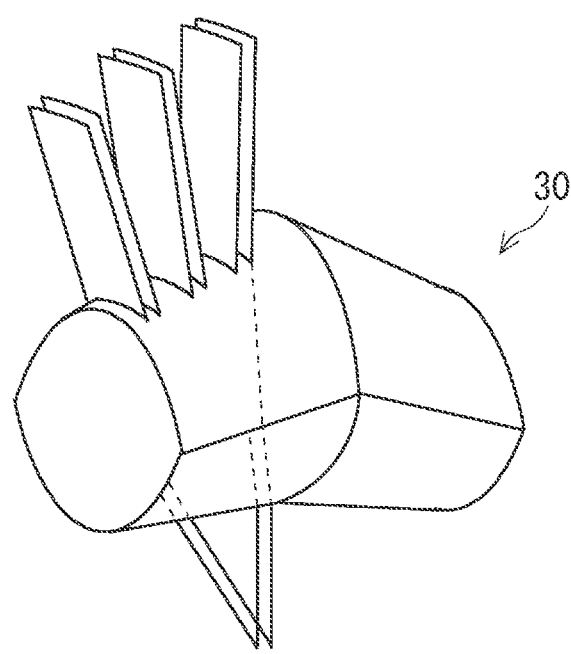
FIG. 23 shows a simulation result when light is radiated at various angles in the second design example of the prism lens shown in FIG. 20.
Figure 24:
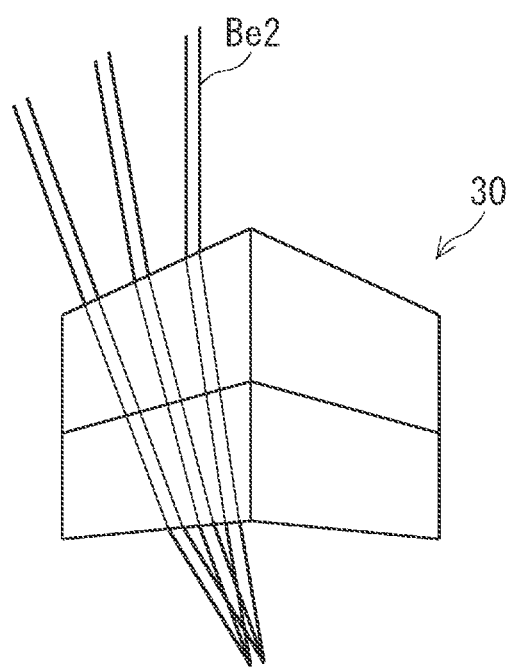
FIG. 24 shows a simulation result when light is radiated at various angles in the second design example of the prism lens shown in FIG. 20.

FIGS. 23 and 24 show a simulation result in a case where light is radiated at various angles from a plurality of radiation positions in the waveguide 6 to one direction (the negative direction (–$\theta$) of the radiation angle $\theta$). FIG. 23 is a perspective view of the prism lens 30, and FIG. 24 is a side view of the prism lens 30. As shown in FIG. 23, it can be seen that output beams are collimated by using the prism lens 30 according to the second design example even when light is radiated at various angles. Also, as shown in FIG. 24, it can be seen that output beams indicated by the arrow Be2 are output in the directly upward direction ($\theta'=0$) by using the prism lens 30 according to the second design example.

Figure 25:
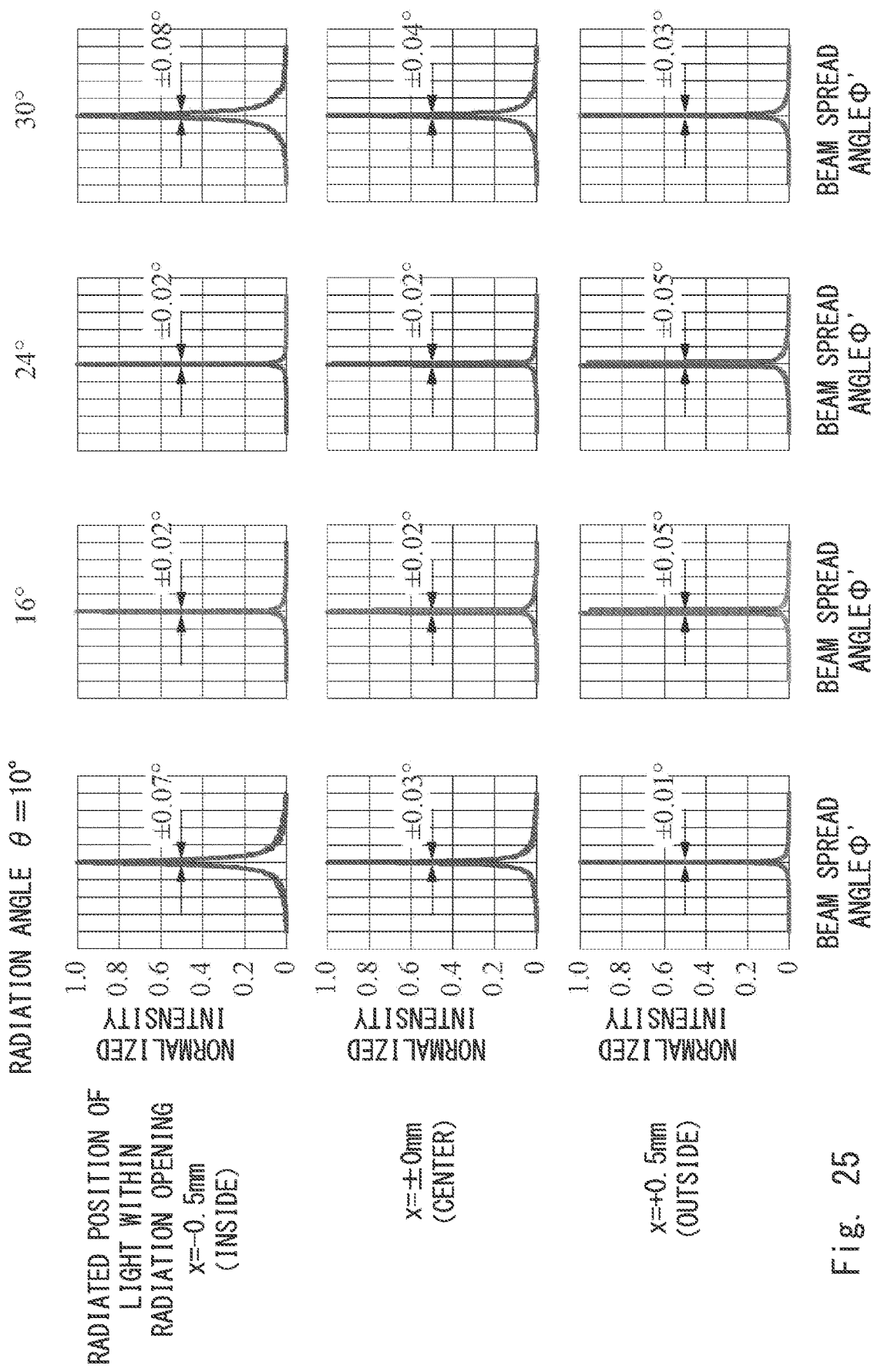
FIG. 25 shows calculation examples of spread angles of output beams in the second design example of the prism lens shown in FIG. 20.

FIG. 25 shows calculations examples of the spread angle $\Phi'$ of the output beams in the second design example of the prism lens 30 shown in FIG. 20. FIG. 25 shows the spread angle $\Phi'$ of the output beams when light is radiated at radiation angles $\theta=10, 16, 24, 300$ from radiation positions X=–0.5, 0, +0.5 mm. In each of drawings, the center of the distribution of the spread angle $\Phi'$ is drawn as 0°, but the full width at half maximum is in a range of $\pm0.01$ to 0.08°. Therefore, it can be seen that the output beams are collimated well when light is radiated at radiation angles $\theta=10, 16, 24, 300$ in the second design example of the prism lens 30 shown in FIG. 20.

Third Embodiment

Next, a third embodiment is described. According to the aforementioned first embodiment and so on, a cylindrical lens is provided on planes on both sides of a set of facing planes that are not parallel to each other of the prism lens body. On the other hand, the third embodiment is different from the first embodiment and so on in that a cylindrical lens is provided on one plane of a set of facing planes that are not parallel to each other of the prism lens body.

Figure 26:
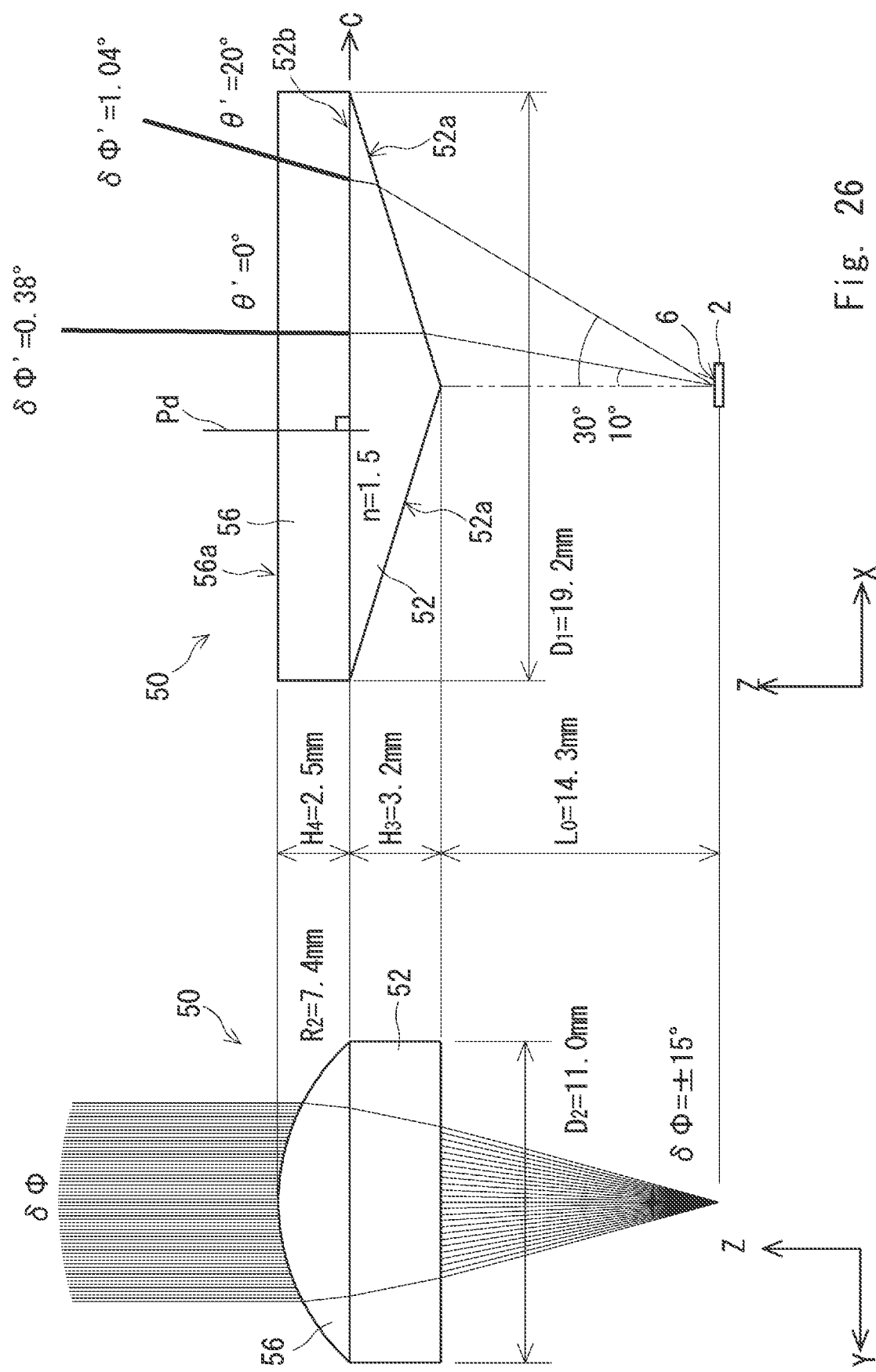
FIG. 26 shows a prism lens according to a third embodiment.

FIG. 26 shows a prism lens 50 according to the third embodiment. The left diagram of FIG. 26 is a front view of the prism lens 50, and the right diagram of FIG. 26 is a side view of the prism lens 50. The prism lens 50 according to the third embodiment has a prism lens body 52 and a cylindrical lens 56. The prism lens body 52 has a set of facing planes 52a and 52b (first plane) that are not parallel to each other. Here, the lower plane (on the photonic crystal waveguide 2 side) of the prism lens body 52 is a plane 52a, and the upper plane (on the far side from the photonic crystal waveguide 2) is a plane 52b. Therefore, the planes 52a and 52b are the set of facing planes a mutual distance of which decreases or increases from their one end to another end. For example, referring to the right diagram of FIG. 26, the distance between the plane 52a and the plane 52b increases once and then decreases from the left end to the right end (positive direction of the X axis). The prism lens 50 is disposed so as to tilt such that the distance between the plane 52a and the photonic crystal waveguide 2 increases as the distance between the plane 52a and the center increases in the X axis direction that is the direction of propagation of light. Here, it is assumed that the plane 52a and the plane 52b are substantially perpendicular to the ZX plane. Therefore, it can be said that the prism lens body 52 is a triangle pole having a plane viewed from the side direction as its bottom surface.

The cylindrical lens 56 is integral to the plane 52b (first plane). Therefore, the prism lens 50 has the cylindrical lens 56 on one (plane 52b) of a set of facing planes that are not parallel to each other. It should be noted that, since the cylindrical lens 56 is integral to the plane 52b, the boundary between the prism lens body 52 and the cylindrical lens 56 is not required to be able to visually check by, for example, cutting the prism lens 50.

Here, the cylindrical lens 56 is formed such that the cross section shape thereof at a plane Pd perpendicular to the direction of the slope (indicated by the arrow C in FIG. 26) of the plane 52b with respect to the plane 52a (the other plane of the set of planes of the prism lens body 22) has a certain curved shape to be convex against the plane 52b. In other words, the cylindrical lens 56 has a uniform shape in the slope direction indicated by the arrow C. Therefore, a ridge line 56a of the cylindrical lens 56 is parallel to the plane 52b. The slope direction indicated by the arrow C is substantially parallel to the ZX plane. The slope direction indicated by the arrow C is also substantially perpendicular to the line of intersection acquired by crossing of the plane 52a and the plane 52b.

By being formed as described above, the prism lens 50 functions as a prism that refracts light when viewed from the side direction. Therefore, use of the prism lens 50 formed as described above enables light in an oblique direction radiated from the waveguide 6 to be deflected in a direction in vicinity of the directly upward direction (output angle $\theta'=0°$) (which solves the second problem). Also, the prism lens 50 functions as a lens having the cylindrical lens 56 when viewed from the front direction. Therefore, like the cylindrical lens 10 shown in FIG. 1, the output light can be collimated at a certain radiation angle $\theta$.

Design conditions for the prism lens 50 shown in FIG. 26 are described below. The refractive index of the prism lens 30 is n=1.5. The radius of curvature of the cylindrical lens 56 is $R_2$=7.4 mm. The entire length (length in the X axis direction) of the prism lens 50 is $D_1$=19.2 mm. The height of the prism lens body 52 at the center is $H_3$=3.2 mm, and the height of the cylindrical lens 56 is $H_4$=2.5 mm. The length in the width direction of the prism lens 50 is $D_2$=11.0 mm. The distance from the waveguide 6 to the center of the prism lens 50 is $L_0$=14.3 mm. The radiation angle $\theta$ is 10, 30°. The radiation spread angle is $\delta\Phi=\pm150$ (=30°). A simulation was performed under these conditions. In this case, it is conceivable that the output angle $\theta'=0°$ can be realized with the radiation angle $\theta=10°$, as shown in FIG. 26. It should be noted that, regarding the spread angle $\Phi'$, the full width at half maximum $\delta\Phi'$=0.380 with the radiation angle $\theta=10°$, and the full width at half maximum $\delta\Phi'$=1.04° with the radiation angle $\theta=30°$. Therefore, by adopting the prism lenses according to the aforementioned first and second embodiments, the output beam can be collimated better independently from the radiation angle θ.

Fourth Embodiment

Next, a fourth embodiment is described. According to the fourth embodiment, an example of an apparatus including the light deflection device 1 having the prism lens according to the first to fourth embodiments is described. Hereinafter, an example in which the light deflection device 1 is applied to a LiDAR apparatus is described. However, the prism lens according to the first to fourth embodiments is applicable to apparatuses other than a LiDAR apparatus.

Figure 27:
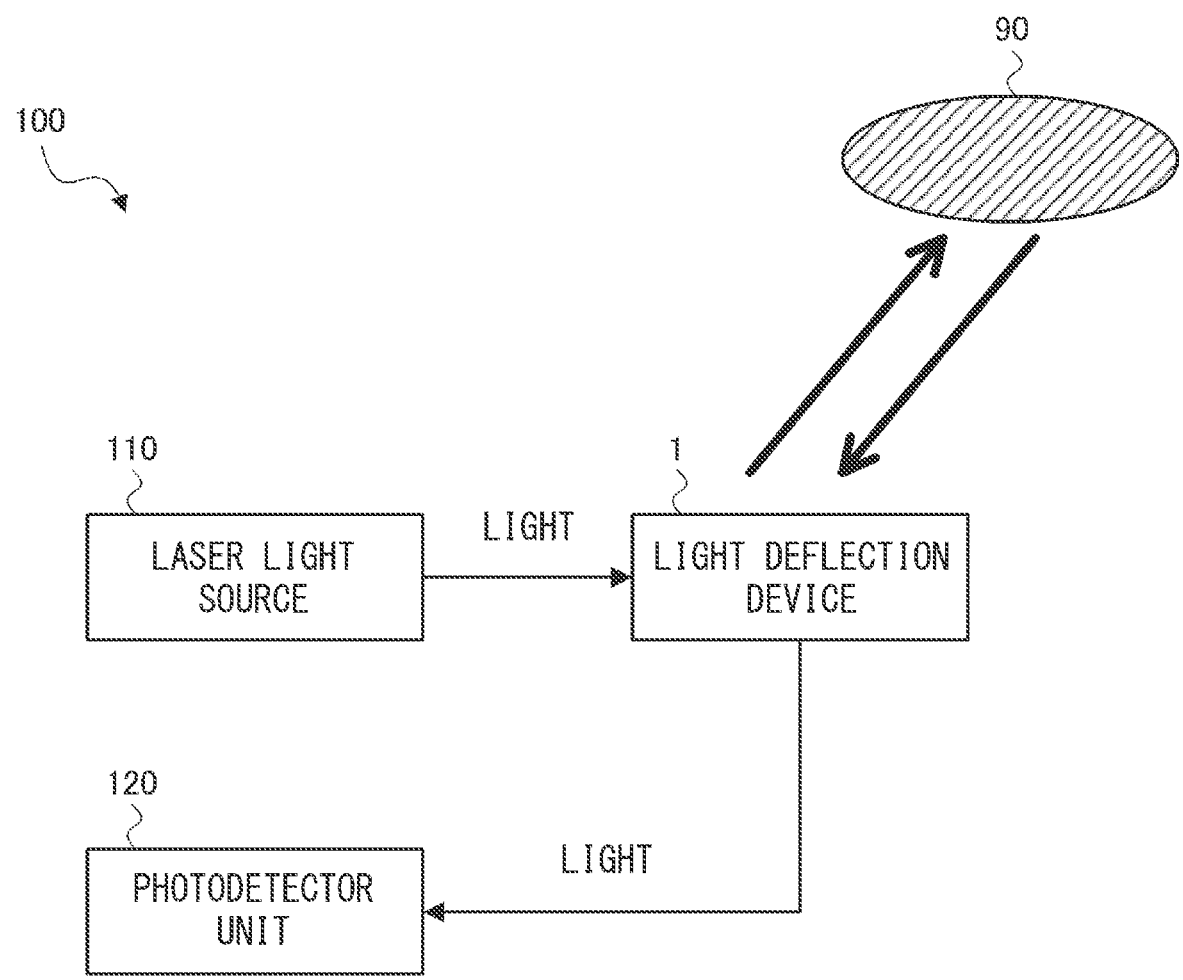
FIG. 27 shows a LiDAR apparatus according to a fourth embodiment.

FIG. 27 shows a LiDAR apparatus 100 according to the fourth embodiment. The LiDAR apparatus 100 includes a laser light source 110, the light deflection device 1, and a photodetector unit 120. The laser light source 110 causes pulsed light or frequency chirping continuous light for use in ranging to enter the light deflection device 1. The light deflection device 1 radiates an output beam resulting from optical pulses input thereto to a ranging target 90.

When the light of the output beam reflected by the ranging target 90 and returning therefrom is received by the light deflection device 1, the received reflected light is input to the photodetector unit 120. Thus, the photodetector unit 120 detects the reflected light. The LiDAR apparatus 100 then calculates a distance to the ranging target 90 based on a time difference between a time when the output beam is output and a time when the reflected light is received or a frequency drift with passage of time of the frequency chirping light.

The photodetector unit 120 may be provided at one end of a path branched from an input waveguide between the laser light source 110 and the light deflection device 1. An optical filter may be provided between the light deflection device 1 and the photodetector unit 120. In this case, the reflected light that is received by the light deflection device 1 may be propagated to the photodetector unit 120 after passing through the optical filter. The laser light source 110 may have the functionality of the photodetector unit 120. In this case, separate provision of the photodetector unit 120 is not necessary.

Variation Examples

It should be noted that the present invention is not limited to the aforementioned embodiments but can be changed as required without departing from the spirit and scope of the present invention. For example, according to the aforementioned embodiments, the cylindrical lens has a shape the cross section of which has a curved shape being an arc. However, the cylindrical lens is not limited to have such a shape. The curved shape of the cross section is not required to be an arc if the cylindrical lens has the functionality of a lens. In other words, the curved shape of the cylindrical lens is not required to have a shape being a part of a side of a cylinder.

According to the first and second embodiments, the slope angle Θ of the lower plane 22a of the prism lens body 22 is smaller than the slope angle Θ' of the upper plane 22b. However, the present invention is not limited thereto. Θ>Θ' may be satisfied. The prism lens may have a shape acquired by vertically inverting the prism lens 20 shown in FIG. 10. Similarly, the prism lens may have a shape acquired by vertically inverting the prism lens 30 shown in FIG. 15. While, according to the third embodiment, the cylindrical lens is provided on the upper plane 52b of the prism lens body 52 as shown in FIG. 26, the present invention is not limited to such a configuration. In a case where the cylindrical lens is provided on one of a set of facing planes that are not parallel to each other of the prism lens body, the cylindrical lens may be provided on the lower plane 52a of the prism lens body 52.

The subject application claims the priority based on Japanese Patent Application No. 2018-203714 filed Oct. 30, 2018, the entirety of which is incorporated herein by reference.

REFERENCE SIGNS LIST 1 light deflection device
2 photonic crystal waveguide
4 diffraction grating
6 waveguide
20 prism lens
22 prism lens body
22a, 22b plane
24 cylindrical lens
26 cylindrical lens
30 prism lens
50 prism lens
52 prism lens body
52a, 52b plane
56 cylindrical lens
100 LiDAR apparatus
110 laser light source
120 photodetector unit

The invention claimed is:

1. A light deflection device, comprising:
a prism lens; and
a waveguide having a diffraction grating formed by periodically arranging a low-refractive-index region on a high-refractive-index member,
wherein the prism lens comprises:
    a prism lens body having a set of facing planes a mutual distance of which decreases or increases from one end to another end; and
    two cylindrical lenses integral to the set of facing planes,
wherein the prism lens is configured such that light radiated from the waveguide enters from one facing plane of the set of facing planes and exits from another facing plane of the set of facing planes,
wherein the prism lens body is formed such that a distance between the set of facing planes is shorter toward a downstream side of the direction of incidence of light to the waveguide, and
wherein each of the two cylindrical lenses is formed such that, for a first cylindrical lens of the two cylindrical lenses, a cross section shape thereof at a first plane perpendicular to a direction of a slope of the one facing plane of the prism lens body having the first cylindrical lens thereon with respect to the other facing plane of the set of facing planes has a certain curved shape to be convex against the one facing plane having the first cylindrical lens thereon, and for a second cylindrical lens of the two cylindrical lenses, a cross section shape thereof at a second plane perpendicular to a direction of a slope of the other facing plane of the prism lens body having the second cylindrical lens thereon with respect to the one facing plane of the set of facing planes has a certain curved shape to be convex against the other facing plane having the second cylindrical lens thereon.

2. The light deflection device according to claim 1, wherein the prism lens body is a first prism lens body, and the light deflection device comprises a second prism lens body having a second set of facing planes and two further cylindrical lenses thereon, wherein the first prism lens body and the second prism lens body are integral to each other such that slope directions of each set of facing planes are symmetrical.

3. The light deflection device according to claim 1, wherein the prism lens body is formed such that a slope angle of the one facing plane of the set of facing planes with respect to the waveguide is smaller than a slope angle of the other facing plane of the set of facing planes with respect to the waveguide.

* * * * *